(12) United States Patent
Kindaichi et al.

(10) Patent No.: US 6,768,867 B2
(45) Date of Patent: Jul. 27, 2004

(54) AUTO FOCUSING SYSTEM

(75) Inventors: Takeshi Kindaichi, Hachioji (JP); Hisayuki Matsumoto, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 10/438,715

(22) Filed: May 15, 2003

(65) Prior Publication Data
US 2004/0042780 A1 Mar. 4, 2004

(30) Foreign Application Priority Data

May 17, 2002 (JP) ........................................ 2002-142699
Jun. 13, 2002 (JP) ........................................ 2002-173160

(51) Int. Cl.[7] .............................................. G03B 13/36
(52) U.S. Cl. ...................... 396/100; 396/112; 348/349
(58) Field of Search .............................. 396/100, 112; 348/345, 349, 350

(56) References Cited

U.S. PATENT DOCUMENTS 3,733,989 A * 5/1973 Wick et al. ................. 396/117
3,860,935 A * 1/1975 Stauffer ....................... 396/112
4,223,988 A * 9/1980 Jyojiki et al. ............... 396/112

FOREIGN PATENT DOCUMENTS

JP        6-313920      11/1994
JP        9-297335      11/1997

* cited by examiner

Primary Examiner—W. B. Perkey
(74) Attorney, Agent, or Firm—Straub & Pokotylo; John C. Pokotylo

(57) ABSTRACT

In an auto focusing system of the present invention, a light from an object is guided by an optical section to a light receiving section constituted of an imager such as a photo-electric transducer, and the object is imaged as a digital image at the light receiving section. A movable split image prism is arranged between a position immediately before a light receiving surface of the light receiving section in an optical path of the optical section and a position outside the optical path. Then, a deviation amount of a vide signal based on light rays passed through the split image prism is detected by a control section, and focusing of the optical section is carried out based on the deviation amount.

14 Claims, 21 Drawing Sheets

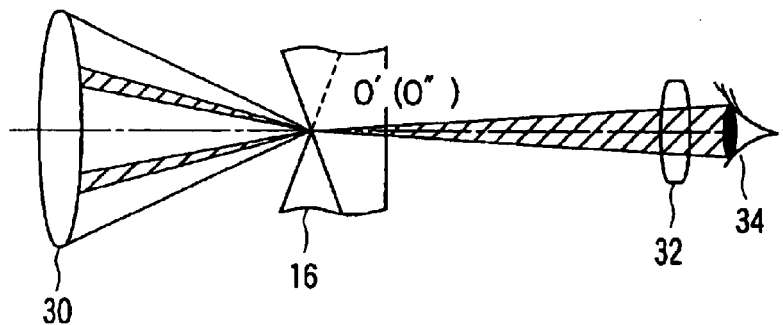 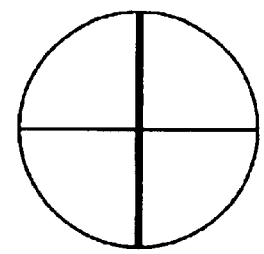
FIG. 4A
FIG. 4B
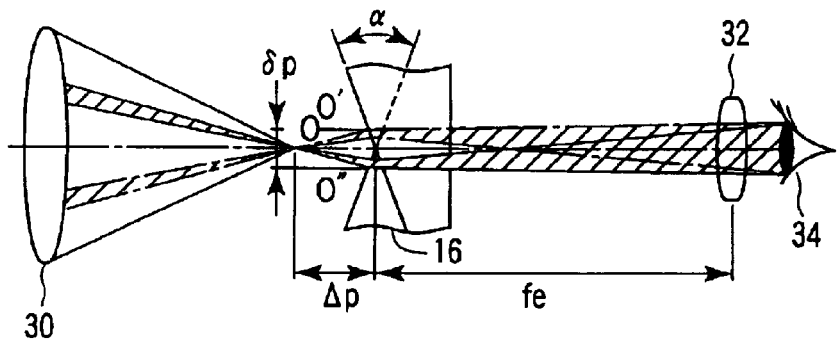 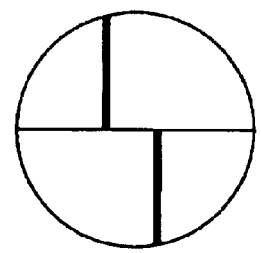
FIG. 5A
FIG. 5B
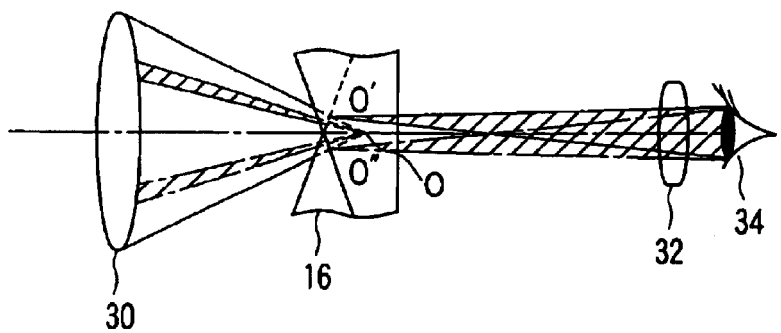 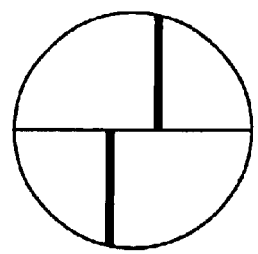
FIG. 6A
FIG. 6B

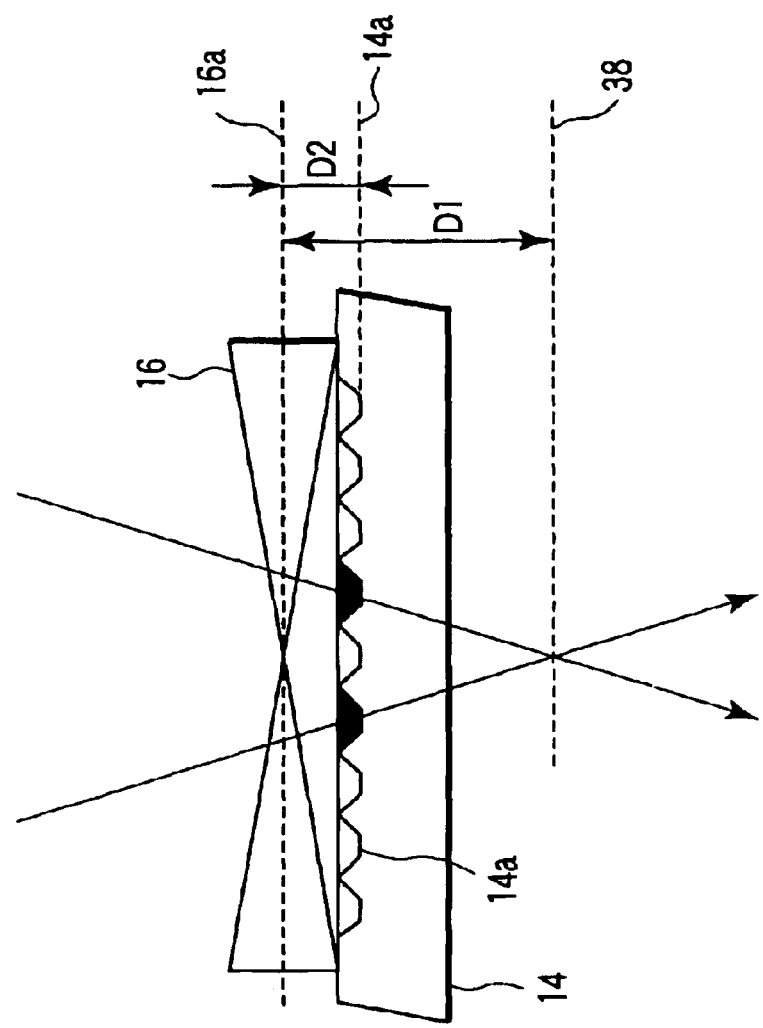
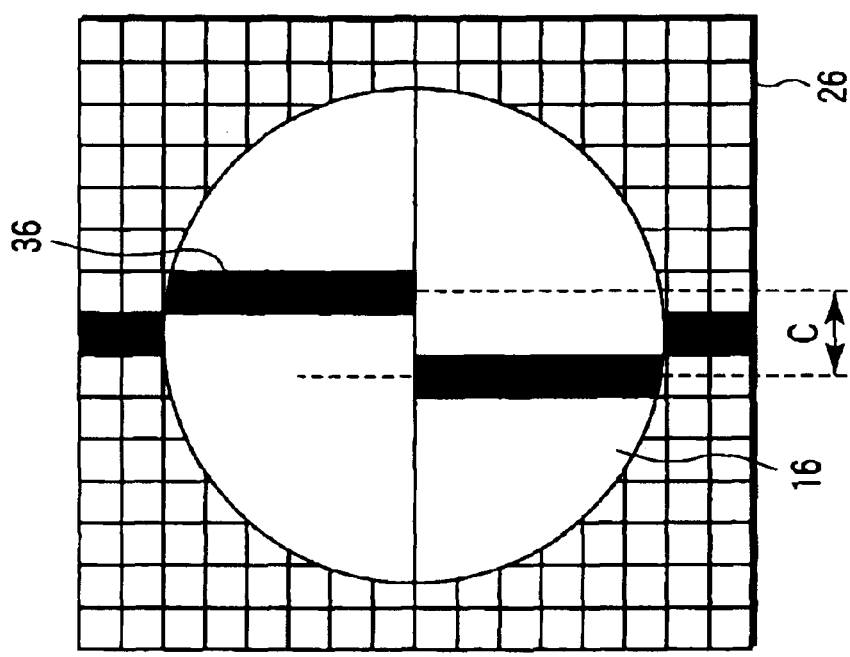
FIG. 7A
FIG. 7B

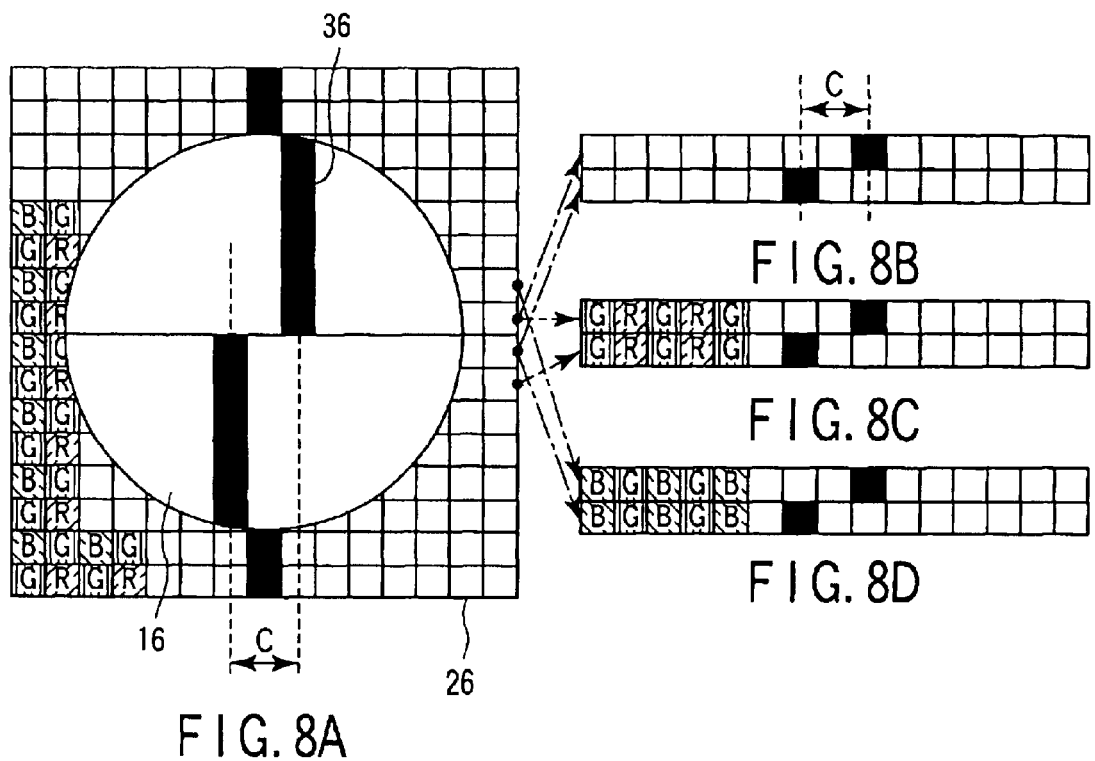
FIG. 8A
FIG. 8B
FIG. 8C
FIG. 8D
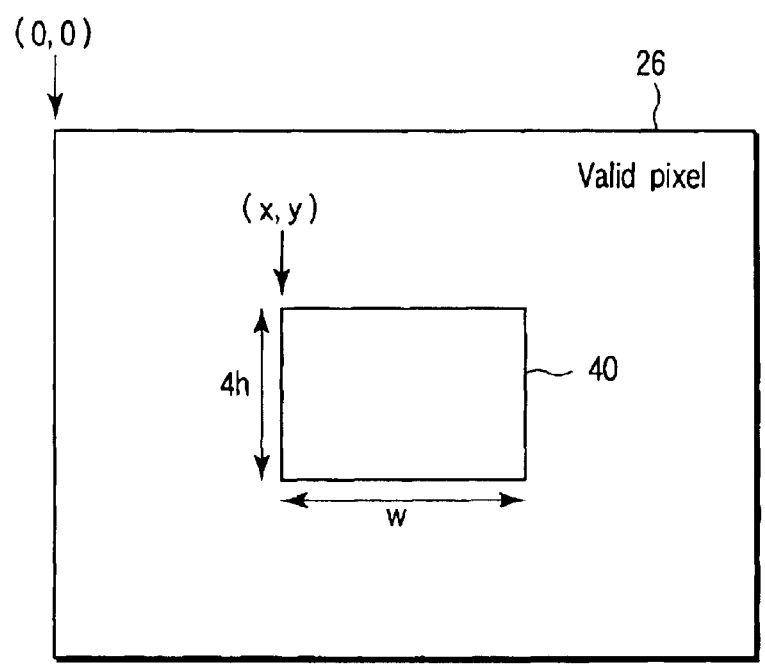
FIG. 9

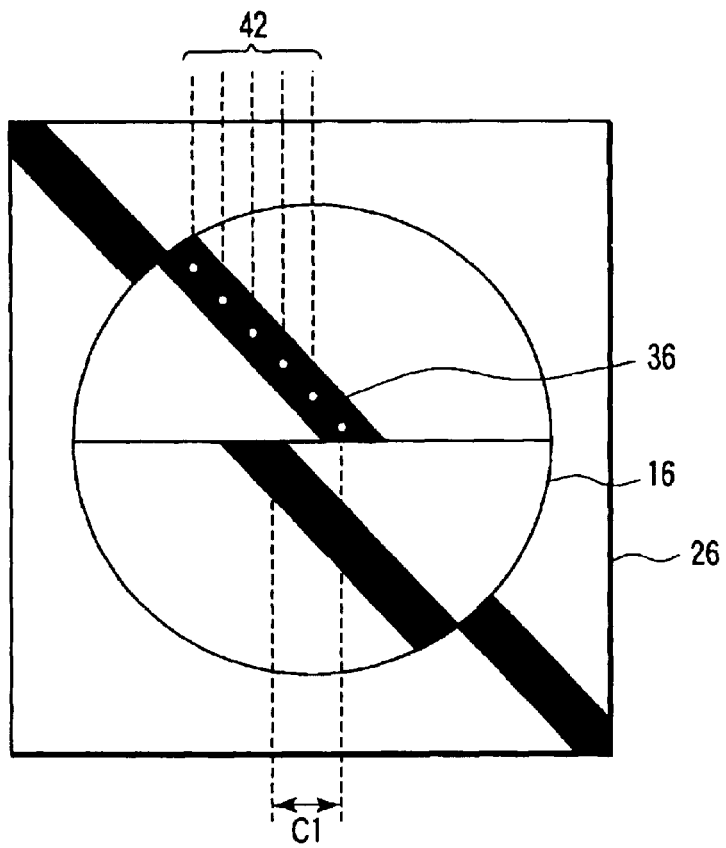
FIG. 11
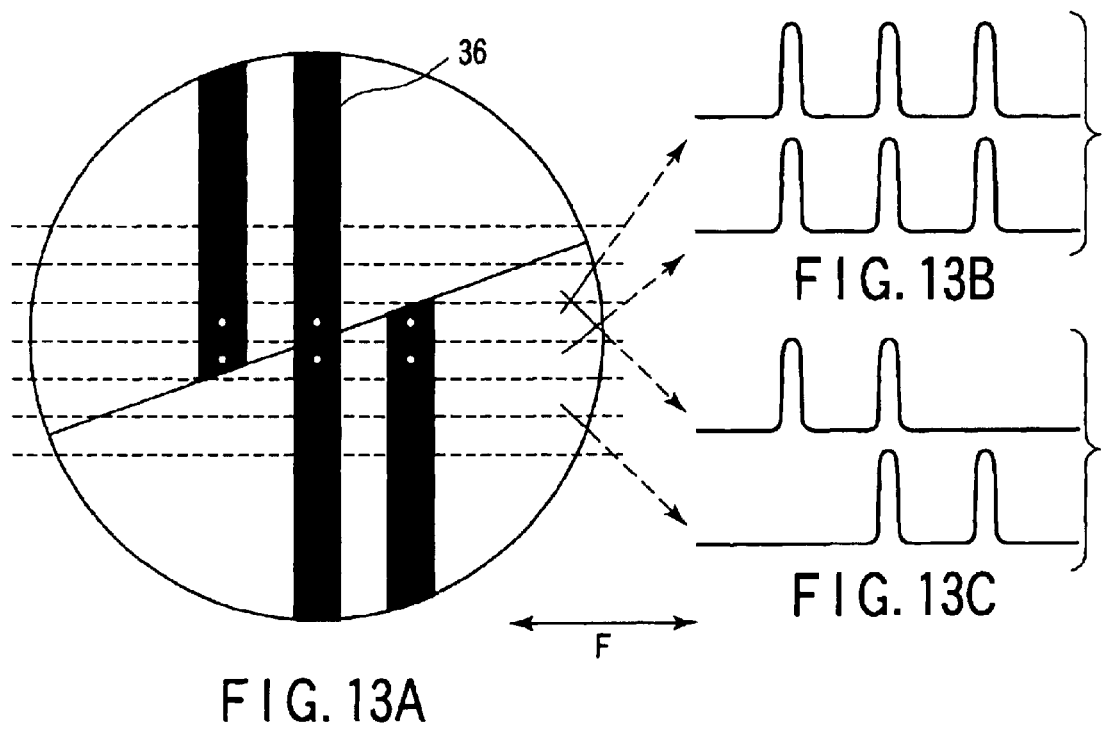
FIG. 13A
FIG. 13B
FIG. 13C

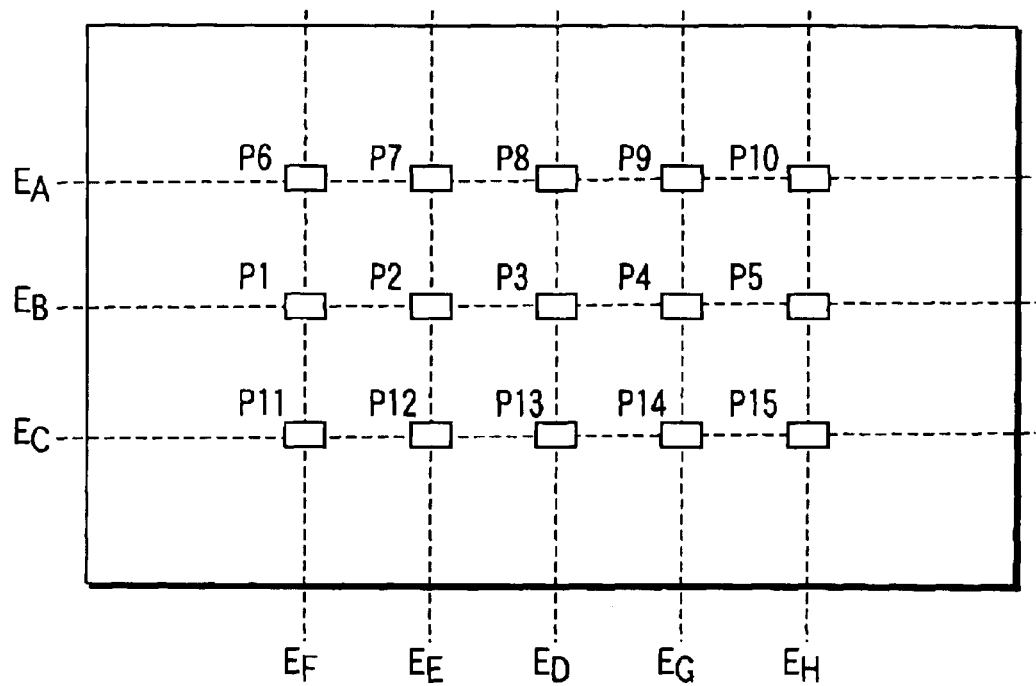
F I G. 21A
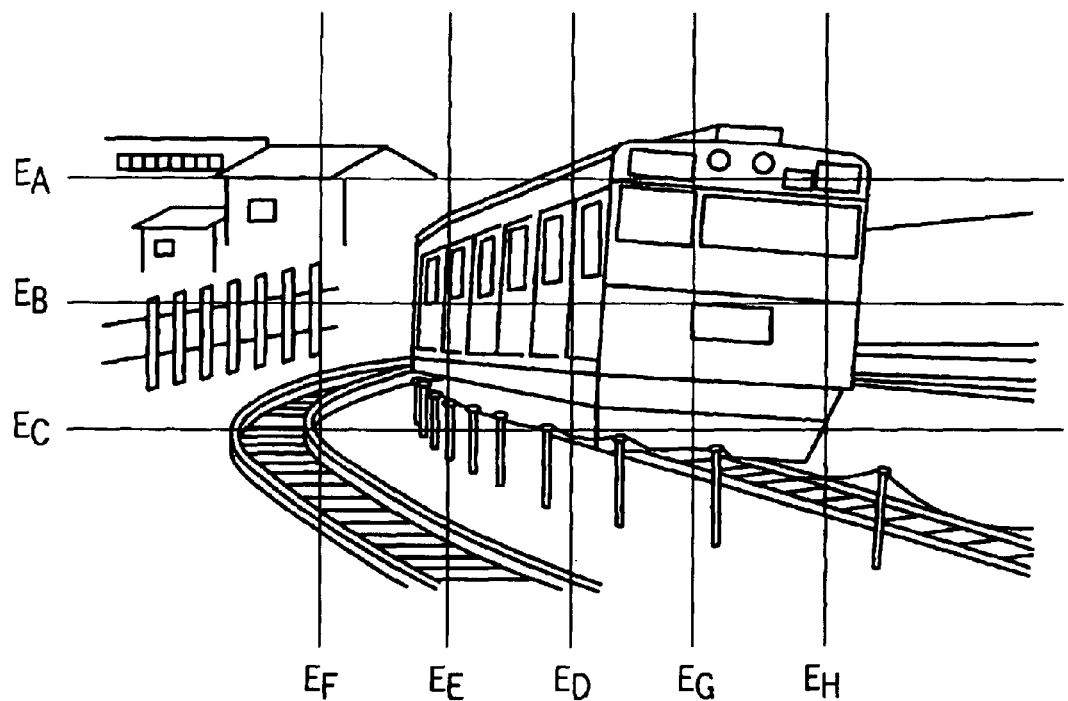
F I G. 21B

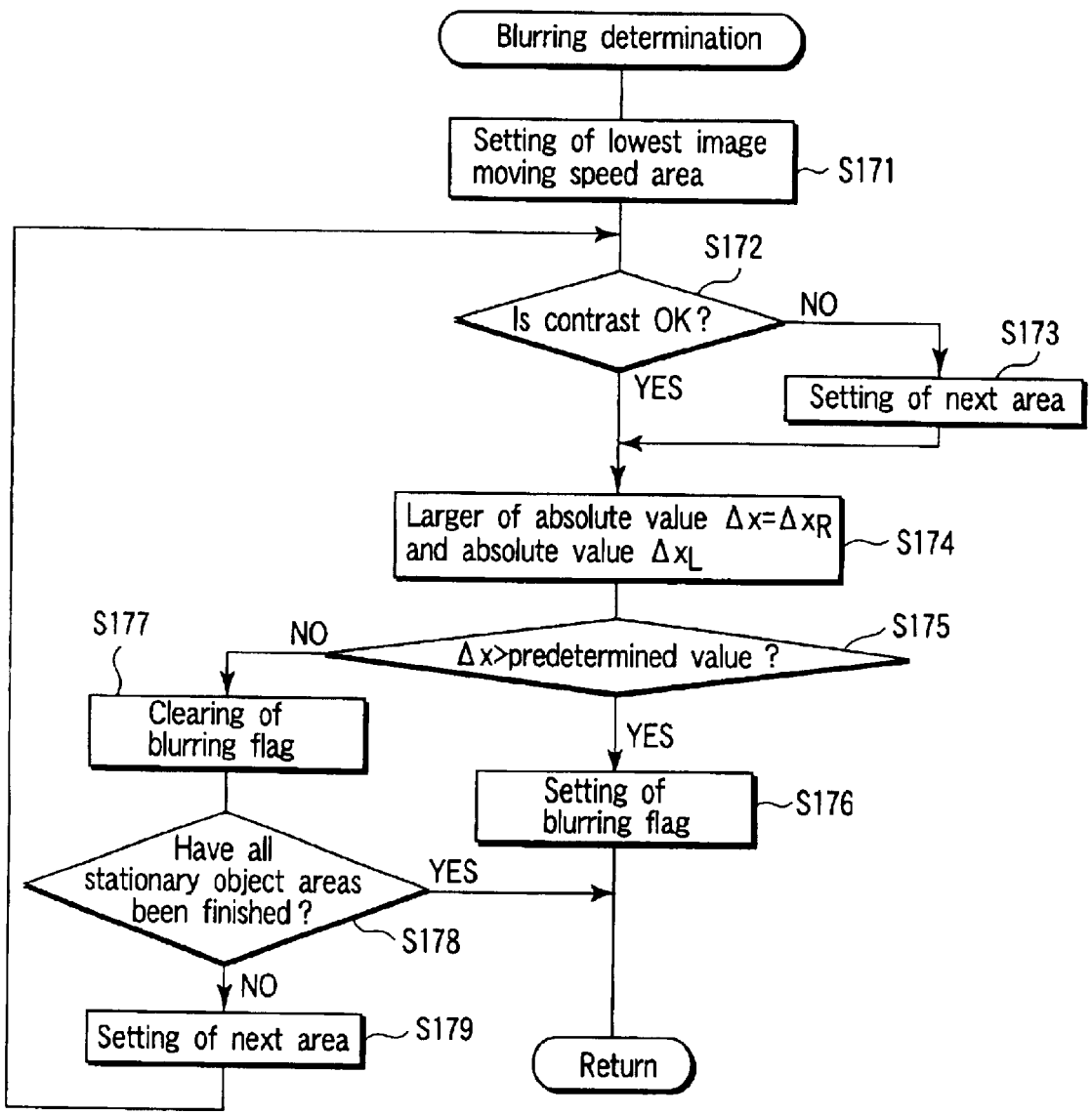
F I G. 31

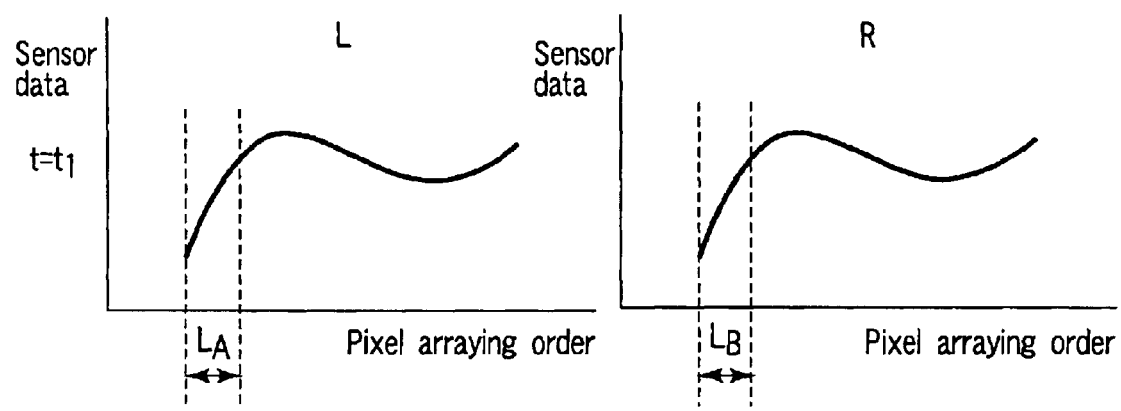
F I G. 32A
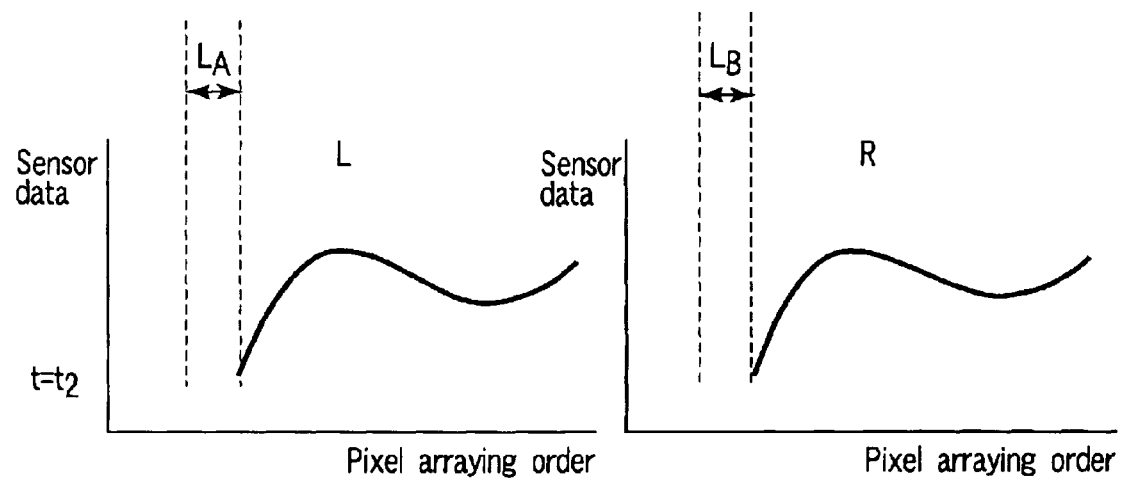
F I G. 32B

AUTO FOCUSING SYSTEM

CROSS-REFERENCE TO RELATED APPLICATIONS

This application is based upon and claims the benefit of priority from the prior Japanese Patent Applications No. 2002-142699, filed (May 17), 2002; and No. 2002-173160, filed (June 13), 2002, the entire contents of which are incorporated herein by reference.

BACKGROUND OF THE INVENTION

1. Field of the Invention

The present invention relates to an auto focusing system.

2. Description of the Related Art

A digital camera has an image pickup device which can electrically detect a video signal through a taking lens. In the digital camera, there is widely known a technology of carrying out focusing to bring it into correct focus by using luminance information of the video signal outputted from this image pickup device.

This is a technology of obtaining a lens position to improve image contract by fine-adjusting the taking lens. As it carries out control for a position of high contrast, the technology is generally called a sharpness detection auto focusing contrast system (AF).

On the other hand, in the single-lens reflex camera of a silver camera, an AF by a through the lens (TTL) phase difference system is generally employed. A luminous flux from an object which is captured through the taking lens is reflected on a movable mirror to be guided to an equivalent surface (primary image forming surface) of a film (primary image formation). Then, a secondary image is formed by a lens installed on the equivalent surface of the film, and the luminous flux is guided to an AF sensor to form a secondary image forming surface. The AF by the TTL phase difference system executes control so as to set a focusing position on the primary image forming surface by moving the lens on the primary image forming surface while executing ranging of a position of the secondary image forming surface.

In addition, the AF by the TTL phase difference system obtains a focusing position by separating the luminous flux of the secondary image forming optical system into two by using a separator lens (pupil division) to place them on a line sensor, and comparing deviation with a preset stipulated value.

Generally, in the camera, there have been presented a technology of a moving object prediction AF which focuses on a moving object, and a technology of carrying out vibration isolation by detecting blurring of a photographer.

For example, Jpn. Pat. Appln. KOKAI Publication No. 6-313920 presents a camera which obtains a characteristic amount of a light amount distribution obtained at a light receiving section, and detects blurring based on a change of the characteristic amount.

Jpn. Pat. Appln. KOKAI Publication No. 9-297335 presents a camera which comprises a moving object determination section for time-sequentially obtaining a plurality of focus detection signals by a focus detection section in accordance with a focusing state of an object image, carrying out prediction calculation for these focus detection signals, and carrying out focusing by a prediction operation to focus on the object moving in an optical axis direction of a taking lens, and a blurring prevention section for preventing the influence of blurring of a photographer, and which carries out no prediction operation when the blurring prevention section is operated.

The aforementioned contrast system AF is advantageous for miniaturizing a camera main body because the AF sensor can also be used for an image pickup sensor. However, since the taking lens is moved in a direction for improving image contrast to obtain a focusing position, it is impossible to detect the amount and the direction of focusing by sensing carried out once. Therefore, time for moving the taking lens is necessary, creating a problem of prolongation of so-called release time lag in a camera technology.

On the other hand, the TTL phase difference system AF can instantaneously obtain a focusing position as it only needs to obtain the focusing position based on deviation from the stipulated value. That is, a release time lag can be shortened. However, since the secondary image forming optical system is necessary to partially extract and pupil-divide the luminous flux from the object and to form an image again, there are problems that the number of components is increased to lead to a cost increase, and the camera main body itself is also enlarged.

Regarding the technology of the aforementioned publication, for example, while moving object detection is carried out by the technology disclosed in Jpn. Pat. Appln. KOKAI Publication No. 6-313920, a vibration isolation operation is inhibited. On the other hand, according to the technology disclosed in Jpn. Pat. Appln. KOKAI Publication No. 9-297335, if a mode is set to execute vibration isolation, the moving object prediction AF is not carried out.

These two technologies cannot coexist with each other simultaneously. It is because the moving object prediction AF technology which requires a small time lag to focus on the moving object conflicts with the vibration isolation technology which waits until the blurring of the photographer becomes small to permit exposure.

Therefore, vibration cannot be isolated during photographing of the moving image, conversely creating a problem of impossible photographing of the moving object if the vibration isolation mode is set. In photographs, there are many cases of photographing objects not moving or not moving so much, such as landscape photographs, snapshots while traveling or commemorative photographs, and it may be better that vibration can be isolated even at the slight sacrifice of focusing accuracy by the photographer.

According to these technologies, the moving object detection and the blurring detection are both made from changes in sensor data obtained by a plurality of timings. Furthermore, for the blurring detection, there has been known a technology which detects blurring based on an output of the AF sensor. That is, to carry out moving object detection, even if the AF sensor outputs are obtained by a plurality of timings, these are not used for hand shaking detection.

BRIEF SUMMARY OF THE INVENTION

Thus, a feature of the present invention is an object to provide an auto focusing system capable of obtaining a focused focal point at a high speed. Another feature of the present invention is to provide an auto focusing system where a main body is not enlarged.

A further feature of the present invention is to provide a camera where moving object detection and hand shaking detection coexist, moving object prediction AF is carried out in a focusing detection area in which the moving object is detected and, in the other areas, hand shaking is detected to carry out moving object and hand shaking detections by using AF sensor outputs.

A first feature of the present invention is to provide an auto focusing system which comprises:

light receiving means for imaging an object as a digital image;

optical means for guiding a light from the object to the light receiving means;

a split image prism movable between a position immediately before a light receiving surface of the light receiving means in an optical path of the optical means and a position outside the optical path of the optical means; and control means for detecting a deviation amount of a video signal based on light rays passed through the split image prism, and focusing the optical means based on the deviation amount.

A second feature of the present invention is to provide an auto focusing system which comprises:

light receiving means for imaging an object as a digital image;

optical means for guiding a light from the object to the light receiving means;

a split image prism installed in a position that is immediately before a light receiving surface of the light receiving means and is outside an optical path of the optical means;

deflection means which is removably inserted into the optical path of the optical means and guides a part of a luminous flux from the object to the split image prism; and control means for detecting a deviation amount of a video signal based on light rays passed through the split image prism, and focusing the optical means based on the deviation amount.

A third feature of the present invention is to provide an auto focusing system comprising:

a light receiving section constituted of an imager such as a photoelectric transducer to image an object as a digital image;

an optical system which guides a light from the object to the light receiving section;

a split image prism movable between a position immediately before a light receiving surface of the light receiving section in an optical path of the optical system and a position outside the optical path of the optical system; and a control section which detects a deviation amount of a video signal based on light rays passed through the split image prism, and focuses the optical system based on the deviation amount.

A fourth feature of the present invention is to provide an auto focusing system comprising:

a light receiving section constituted of an imager such as a photoelectric transducer to image an object as a digital image;

an optical system which guides a light from the object to the light receiving section;

a split image prism installed in a position that is immediately before a light receiving surface of the light receiving section and is outside an optical path of the optical system;

a deflection member which is removably inserted into the optical path of the optical system and guides a part of a luminous flux from the object to the split image prism; and a control section which detects a deviation amount of a video signal based on light rays passed through the split image prism, and focuses the optical system based on the deviation amount.

A fifth feature of the present invention is to provide an auto focusing system which comprises:

focus detection means which is divided into a plurality of focus detection areas to output a focus detection signal;

image moving amount calculation means for calculating a moving amount of an object in each focus detection area based on the focus detection signal;

moving object determination means for determining movement of the object based on an output of the image moving amount calculation means; and blurring amount calculation means for calculating an amount of blurring based on the focus detection signal regarding the focus detection area in which no movement of the object is determined by the moving object determination means.

Additional features and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 4A and 4B show a relation between the split image prism and a focused state: FIG. 4A a view explaining a state of the split image prism and an image of an object at focused time, and FIG. 4B a view showing an example of an appearance of the image of the object in the state of FIG. 4A.

FIGS. 5A and 5B show a relation between the split image prism and a focused state: FIG. 5A a view explaining a state of the split image prism and an image of an object when the image of the linear object is focused before the split image prism (prefocus), and FIG. 5B a view showing an example of an appearance of the image of the object in the state of FIG. 5A.

FIGS. 6A and 6B show a relation between the split image prism and a focused state: FIG. 6A a view explaining a state of the split image prism and an image of an object when the image of the linear object is focused after the split image prism (post focus), and FIG. 6B a view showing an example of an appearance of the image of the object in the state of FIG. 6A.

FIGS. 7A and 7B show a relation between focus deviation and deviation of a video signal: FIG. 7A a top view, and FIG. 7B a side view showing a detected focus deviation amount (defocusing amount) and an offset amount.

FIGS. 8A to 8D show an example of extracting only a signal to be processed from a video signal for detecting a deviation amount of the video signal: FIG. 8A a view showing an image of the post focus on the split image prism on a valid pixel constituted of a plurality of cell arrays arranged in a horizontal direction, FIG. 8B a view showing an example of a pixel output when each pixel of FIG. 8A is black and white (i.e., no color filters), FIG. 8C a view showing an example of a pixel output of Bayer arrangement of RGB primary colors of each pixel, and FIG. 8D a view showing another example of a pixel output of Bayer arrangement of RGB primary colors of each pixel.

FIG. 9 is a view of a detection area in the valid pixel, explaining a focusing operation in the first embodiment of the present invention.

FIG. 11 is a view explaining an error caused by an oblique component of a video signal.

FIGS. 13A to 13C explain a rotational error of the split image prism: FIG. 13A a view showing an example where split portions of the split image prism are oblique to two images, FIG. 13B a view explaining deviation of a component of a vide signal of an adjacent sensor array; and FIG. 13C a view explaining deviation of a video signal of an adjacent sensor array.

FIGS. 21A and 21B show a constitution of a focus detection area in a photographing screen: FIG. 21A a view showing an arrangement example of each ranging area, and FIG. 21B a view showing an example of a moving object.

FIG. 22A a view corresponding to an area 88a of FIG. 19, and FIG. 22B a view corresponding to an area 88b of FIG. 19.

FIG. 24A a view showing an example where the object approaches straight to a camera, FIG. 24B is a view showing an example where the object moves in parallel to the left of the camera, FIG. 24C a view showing an example where the object approaches to the left front of the camera, and FIG. 24D a view showing an example where the object moves away to the left rear side of the camera.

FIG. 25A a view showing an example of an object image signal L(I), and FIG. 25B a view showing an example of an object image signal R(I).

FIG. 31 is a flowchart explaining a subroutine of blurring determination of FIG. 27.

FIGS. 32A and 32B are for explaining a concept of hand shaking determination: FIG. 32A a view showing sensor data outputs of L and R sides by adjacent pixels in an optional area where there is a stationary object imaged at time $t_1$, and FIG. 32B a view showing a sensor data output imaged at time $t_2$ after the passage of predetermined time from the time $t_1$.

DETAILED DESCRIPTION OF THE INVENTION

Next, the preferred embodiments of the present invention will be described with reference to the accompanying drawings.

Figure 1:
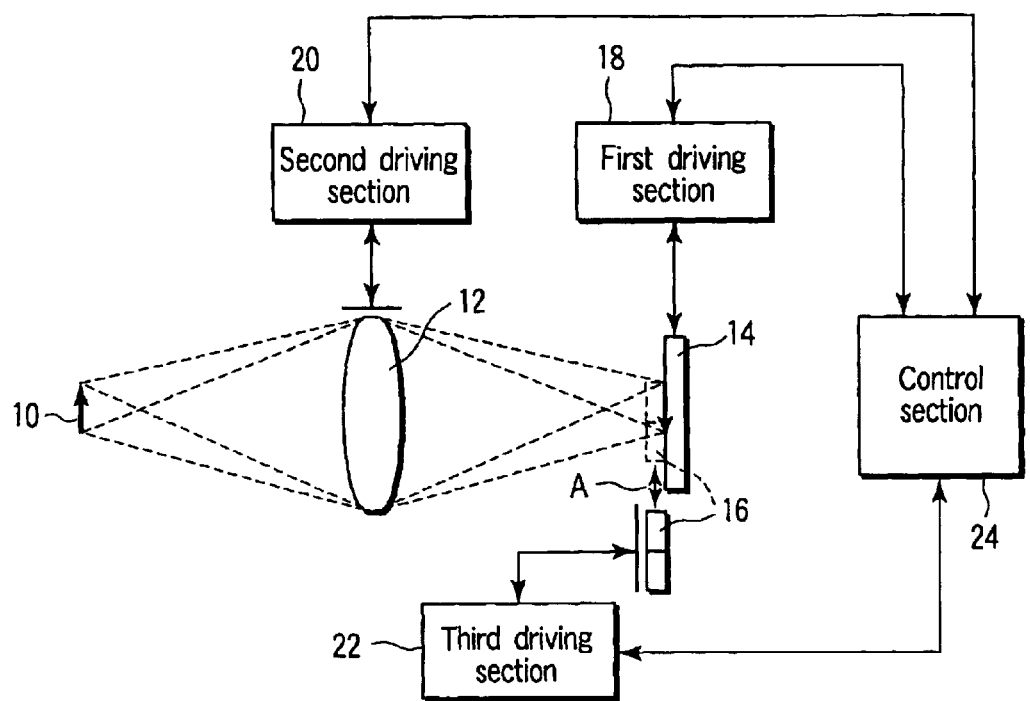
FIG. 1 is a block diagram showing a basic configuration of an auto focusing system according to a first embodiment of the present invention.

FIG. 1 is a block diagram showing a basic configuration of an auto focusing system according to a first embodiment of the present invention.

In FIG. 1, a photographing luminous flux from an object 10 is guided through an optical section 12 to a light receiving section of an image pickup device having a photoelectric transducer such as a CCD or a MOS. On the front part of the light receiving section 14, a split image prism 16 is installed. The light receiving section 14 and the optical section 12 are controlled to be driven by a control section 24 through a first driving section 18 and a second driving section 20.

Further, the split image prism 16 is controlled to be driven by the control section 24 through a third driving section 22, and thereby moved in a shown arrow direction A. That is, the split image prism 16 is inserted into/pulled out from the surface of the light receiving section 14 by the control section 24 and the third driving section 22.

The first driving section 18 comprises driving means of an image signal processing system, and the second and third driving sections 20 and 22 comprise driving means of mechanism systems.

Figure 2:
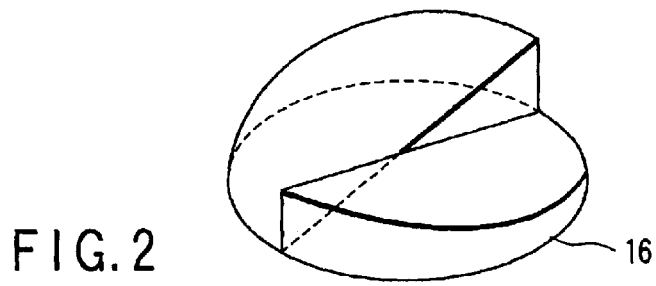
FIG. 2 is an appearance perspective view showing a constitution of a split image prism.

FIG. 2 is an appearance perspective view showing a constitution of the split image prism 16.

As shown in FIG. 2, the split image prism 16 is constituted by arranging two semicircle wedge-shaped prisms inclined in opposing directions up and down or obliquely.

Figure 3:
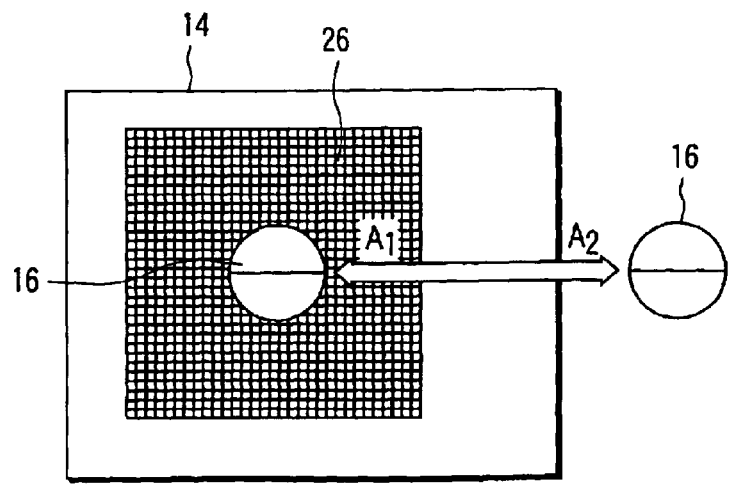
FIG. 3 is a top view showing a position of the split image prism on a light receiving section.

FIG. 3 is a top view showing a position of the split image prism 16 on the light receiving section 14.

The light receiving section 14 has a plurality of valid pixels 26 and, at AF time, the split image prism 16 is moved in a shown arrow direction $A_1$ to be arranged roughly on the center of the valid pixels 26. During photographing, the split image prism 16 is moved in a shown arrow direction $A_2$ to be arranged outside the light receiving section 14. Thus, a luminous flux from the object is never blocked during photographing.

Each of FIGS. 4A to 6B shows a relation between the split image prism and a focused state. This relation between the split image prism and the focused state is described in detail in pp. 108 to 111 of "CAMERA TECHNOLOGY HANDBOOK" by Shashin Kogyo Publishing Company (by Aizo SUZUKI, Jul. 5, 1979). Thus, a principle is briefly described here based on the constitution thereof.

The split image prism is a typical upper and lower image matching system where an intersection between two wedge-shaped prisms positioned on the optical axis of a taking lens (optical section 12) is a focal surface, and images are deviated on a boundary of the prisms.

FIG. 4A is a view explaining a state of the split image prism and an image of the object at the time of focusing, and FIG. 4B a view showing an example of an appearance of the image of the object in the state of FIG. 4A.

The image of the linear object is formed on an intersection line O of the two upper and lower wedge-shaped prisms of the split image prism 16 by a taking lens 30. Thus, for both of the two upper and lower wedge-shaped prisms, images can be formed on completely the same position O' (O"). At this time, as shown in FIG. 4B, upper and lower lines (images of the object) seem one line to the eye 34 of a user through an eyepiece.

FIG. 5A is a view explaining a state of the split image prism and the image of the object when the image of the linear object is formed before the split image prism (prefocus), and FIG. 5B a view showing an example of an appearance of the image of the object in the state of FIG. 5A.

In this case, lights are refracted in opposite directions by the upper and lower wedge-shaped prisms, and the image is seen to be divided left and right O', O".

Further, FIG. 6A is a view explaining a state of the split image prism and the image of the object when the image of the linear object is formed after the split image prism (post focus), and FIG. 6B a view showing an example of an appearance of the image of the object in the state of FIG. 6A.

In this case, the images are deviated in directions opposite those of the images shown in FIGS. 5A and 5B.

In FIG. 5A, $\alpha$ denotes a wedge angle of the split image prism 16, $f_e$ a focal distance of the eyepiece 30, $\Delta_p$ a minimum out-of-focus amount, and $\delta_p$ an image separation amount.

Thus, in the split image prism, the ways of deviation of the upper and lower images are different between the pre-focus and the post focus, and a rotational direction of the taking lens is normally set in a direction where image deviation is reduced.

FIGS. 7A and 7B show a relation between focus deviation and deviation of a video signal in the first embodiment. FIG. 7A is a top view, and FIG. 7B is a side view showing a detected focus deviation amount (defocusing amount) and an offset amount. A shown arrow C represents a deviation amount of the video signal. A shown arrow D1 represents a detected defocusing amount, and an arrow D2 represents a defocusing amount to be corrected (offset).

Now, it is assumed that a focus is set on the light receiving surface of the light receiving section 14 by the contrast system. It is additionally assumed that the split image prism 16 is inserted immediately before the light receiving surface of the light receiving section 14 on this state, and an image forming position is shifted form light receiving surface 14a to a current position of a receiving surface 38.

At this time, if a deviation amount of a video signal by the insertion of the split image prism 16 is detected, this deviation amount of the video signal is equivalent to the offset (distance between a split image prism surface 16a and the light receiving surface 14a) of the defocusing amount. Accordingly, by setting this as an adjustment value, focusing can be correctly carried out. This offset is generated by a space or the like necessary for the movement of, e.g., an optical low-pass filter, protective glass of the image pickup device or the split image prism.

In accordance with the adjustment value, in order to make an image deviated in a horizontal direction (see FIG. 6B) one linear image (see FIG. 4B), that is, to focus, a position of the taking lens 30 is driven in the optical axis direction. Here, a wedge angle of the split image prism is set to enable proper detection of a light made incident on the light receiving section 14 corresponding to the diaphragm of the optical section 12, and to satisfy a requirement of detection accuracy for focusing.

FIGS. 8A to 8D show an example of extracting only a signal to be processed from video signals in order to detect a deviation amount of the video signal in the following manner. That is, FIG. 8A is a view showing an image of a post focus on the split image prism on the valid pixel constituted of a plurality of pixels arrayed in a horizontal direction. FIG. 8B is a view showing an example of a pixel output when each pixel of FIG. 8A is black and white (i.e., no color filters), FIG. 8C a view showing an example of a pixel output of Bayer arrangement where each pixel of FIG. 8A is RGB primary colors, and FIG. 8D a view showing another example of a pixel output of Bayer arrangement where each pixel of FIG. 8A is RGB primary colors.

RGB in the drawings denote sensors having color filters of red, green and blue.

In the embodiment, each pixel of the image pickup device for imaging the object as a digital image is considered as a sensor where a plurality of sensor arrays constituted of sensors of pixels arrayed in a side direction, i.e., horizontal direction, are arrayed in a longitudinal direction, i.e., vertical direction.

As shown in FIG. 8A, if a two-dimensionally arranged valid pixel 26 comprises a plurality of black and white sensor arrays, the image 36 of the deviated video signal is represented, e.g., as shown in FIG. 8B, by two sensor arrays adjacent in the longitudinal direction. In this case, upper and lower images having a shown deviation amount are extracted, phase difference calculation is carried out for the deviation amount of the video signal to obtain a focusing position of the image.

If the valid pixel 26 shown in FIG. 8A comprises a plurality of color sensor arrays, the image 36 of the deviated video signal is represented, e.g., as shown in FIGS. 8C and 8D, by two sensor arrays arrayed in the longitudinal direction. That is, for sensor array outputs of Bayer arrangement of RGB primary colors, for example, since sensor arrays of the same coloring are arranged for every other column, to compare the upper and lower images, the sensor arrays of the same coloring arranged for every other column are used. Then, phase difference calculation is carried out for the deviation amount of the video signal shown in FIGS. 8C and 8D to obtain a focusing position of the image.

Which position on the valid pixel 26 the splitting position of the split image prism 16 is in is not constant due to an assembling error or a driving error. Thus, a plurality of columns of upper and lower video signals are extracted and, based on the deviation amount of the video signal to be detected, focusing is carried out.

Next, a focusing operation of the first embodiment will be described by referring to FIGS. 9 and 10.

Figure 10:
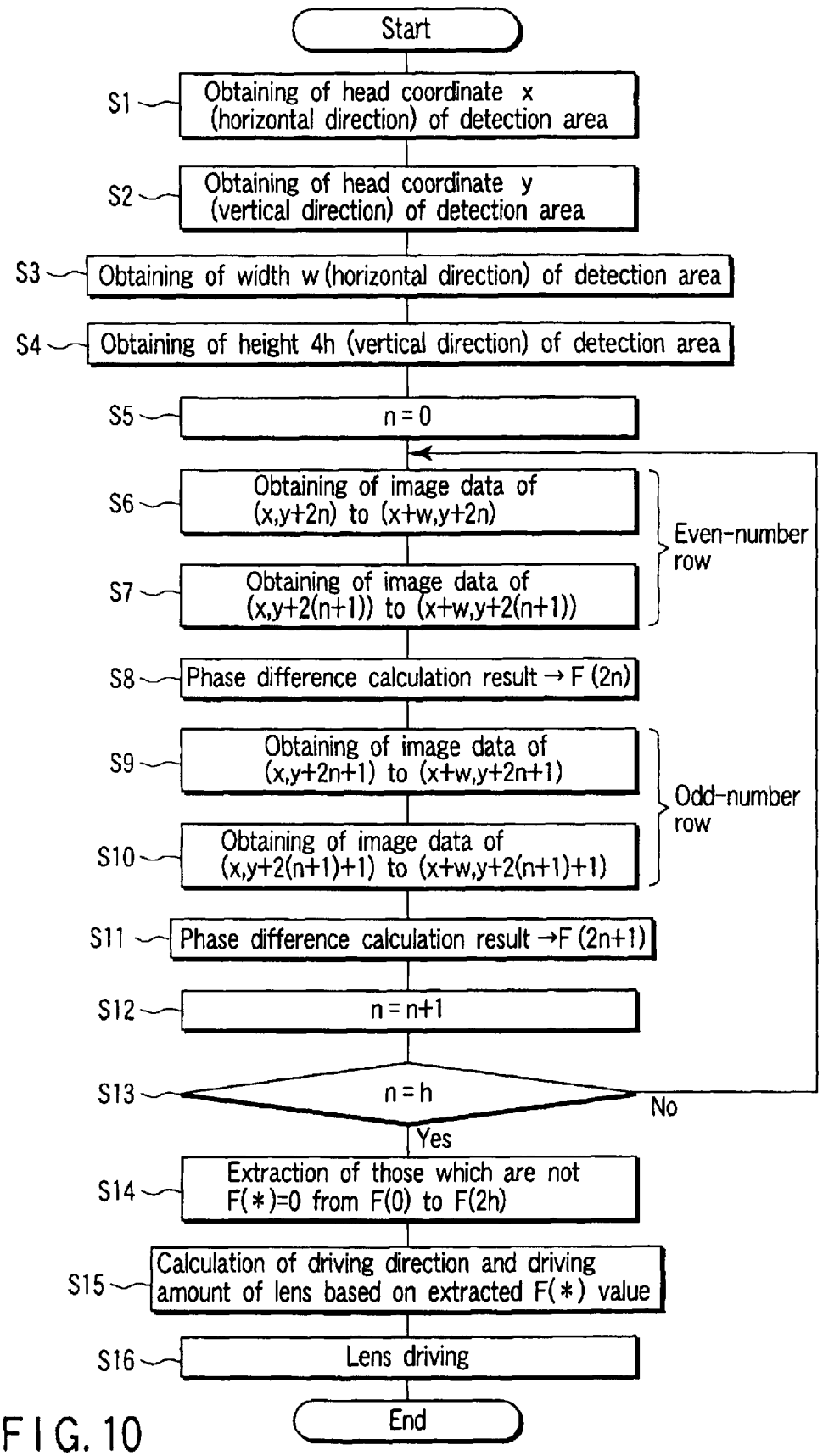
FIG. 10 is a flowchart showing the focusing operation in the first embodiment of the present invention.

FIG. 9 is a view showing a detection area in the valid pixel, and FIG. 10 is a flowchart explaining the focusing operation of the first embodiment. This operation is controlled by the control section 24.

In the focusing operation, first, in step S1, a head coordinate x in a horizontal direction of a detection area 40 in the valid pixel 26 is obtained. Simultaneously, in step S2, a head coordinate y in a vertical direction of the detection area is obtained.

Then, in step S3, a width w in the horizontal direction of the detection area 40 shown in FIG. 9 is obtained. Further, in step S4, a height 4 h in the vertical direction of the detection area 40 is obtained. Then, in step S5, 0 indicating a first line of the sensor array in the valid pixel 26 is set to n.

In step S6, image data from x of y+2n row to x+w are obtained. Subsequently, in step S7, image data from x of y+2(n+1) row to x+w are obtained. Thus, image data of the first and second rows of even-number rows in the detection area 40 are obtained. Then, in step S8, phase difference calculation is carried out based on the image data obtained in steps S6 and S7, and its result is written in a storage area F(2n) of a not-shown memory section.

In step S9, image data from x of y+2n+1 row to x+w are obtained. Subsequently, in step S10, image data from x of y+2(n+1)+1 row to x+w are obtained. Thus, image data of the first and second rows of odd-number rows in the detection area 40 are obtained. Then, in step S11, phase difference calculation is carried out based on the image data obtained in steps S9 and S10, and its result is written in a storage area F(2n+1) of the not-shown memory section.

Then, in step S12, after a value of n is incremented, the value of n is determined in step S13. The image data of totally four rows, i.e., two rows each of the even-number and odd-number rows, have been obtained in steps S6, S7, S9, S10. Thus, if reaching to the height h for the four rows is determined, it means that determination is made for all the rows (height 4 h) in the detection area 40. Therefore, the process of steps S6 to S13 is repeated until n=h is reached (YES) in step S13.

Then, if all the image data in the detection area 40 have been obtained, the process moves to step S14, where F(*) which is not 0 is extracted from F(0) to F(2h). Here, 0 is set in the case of a predetermined amount or lower. The predetermined amount is a value preset based on a noise level. A portion of F(*)=0 is a portion of an image not separated on the split image prism, and the portion of F(*)=0 becomes a splitting position for separating the image.

Thus, in step S15, based on a value of the F(*) extracted in step S14, a driving direction and a driving amount of the lens are calculated. In step S16, the taking lens is driven based on the calculated driving direction and amount to execute focusing.

FIG. 11 is a view explaining an error caused by an oblique component of the video signal. In the drawing, a reference numeral 42 denotes an error caused by the oblique component of the video signal, and an arrow C1 represents a deviation amount of the video signal to be obtained.

Referring to FIGS. 7A to 8D, the basic image deviation has been described above in the case where the video signal deviation occurs only in the upper and lower sides sandwiching the splitting portion of the split image prism 16, and no deviation occurs on the other places. Actually, however, it seldom happens that the video signal deviation occurs only on the upper and lower sides sandwiching the splitting portion of the split image prism 16, and no deviation occurs on the other places. Thus, description will be made of an example where image deviation occurs obliquely sandwiching the splitting portion by referring to FIGS. 11 and 12.

Figure 12:
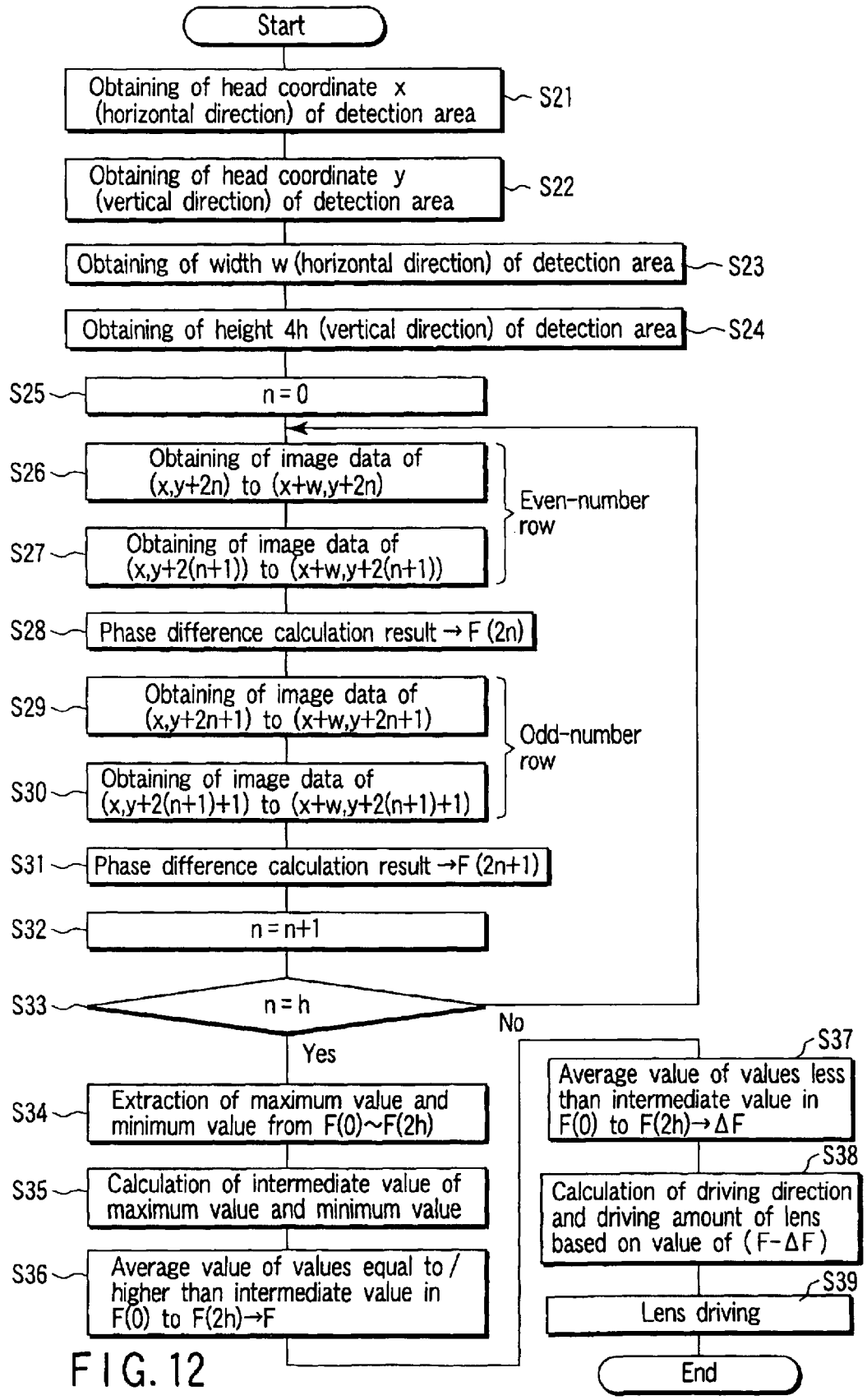
FIG. 12 is a flowchart explaining a focusing operation carried out by considering the error caused by the oblique component of the video signal.

FIG. 12 is a flowchart explaining the focusing operation which considers an error caused by the oblique component of the video signal. This operation is controlled by the control section 24.

In the focusing operation, first, in step S21, a head coordinate x in a horizontal direction of a detection area 40 in the valid pixel 26 is obtained. Simultaneously, in step S22, a head coordinate y in a vertical direction of the detection area is obtained.

Then, in step S23, a width w in the horizontal direction of the detection area 40 shown in FIG. 9 is obtained. Further, in step S24, a height 4h in the vertical direction of the detection area 40 is obtained. Then, in step S25, 0 indicating a first line of the sensor array in the valid pixel 26 is set to n.

In step S26, image data from x of y+2n row to x+w are obtained. Subsequently, in step S27, image data from x of y+2(n+1) row to x+w are obtained. Thus, image data of the first and second rows of even-number rows in the detection area 40 are obtained. Then, in step S28, phase difference calculation is carried out based on the image data obtained in steps S26 and S27, and its result is written in a storage area F(2n) of a not-shown memory section.

In step S29, image data from x of y+2n+1 row to x+w are obtained. Subsequently, in step S30, image data from x of y+2(n+1)+1 row to x+w are obtained. Thus, image data of the first and second rows of odd-number rows in the detection area 40 are obtained. Then, in step S31, phase difference calculation is carried out based on the image data obtained in steps S29 and S30, and its result is written in a storage area F(2n+1) of the not-shown memory section.

Then, in step S32, after a value of n is incremented, the value of n is determined in step S33. The image data of totally four rows, i.e., two rows each of the even-number and odd-number rows, have been obtained in steps S26, S27, S29, S30. Thus, if reaching to the height h for the four rows is determined, it means that determination is made for all the rows (height 4 h) in the detection area 40. Therefore, the process of steps S26 to S33 is repeated until n=h is reached (YES) in step S33.

Then, if all the image data in the detection area 40 have been obtained, the process moves to step S34, where a maximum value and a minimum value are extracted from F(0) to F(2 h). Then, in step S35, an intermediate value between the maximum value and the minimum value obtained in step S34 is calculated.

Further, in step S36, an average value equal to/higher than the intermediate value of F(0) to F(2 h) is obtained, and written in a storage areas F of the memory section. Then, in step S37, an average value less than the intermediate value of F(0) to F(2 h) is obtained, and written in a storage area ΔF of the memory section.

In step S38, based on a difference (F−ΔF) of the two average values obtained in steps S36 and S37, a driving direction and a driving amount of, the lens are calculated. Accordingly, in step S39, a position of the taking lens is driven based on the calculated driving direction and amount to execute focusing.

Next, description will be made of the focusing operation which considers a rotational error of the split image prism 16.

As described above, the split image prism 16 can be inserted into/pulled out from the light receiving section 14 by the third driving section 22. Here, the split image prism 16 is not always arranged accurately on the valid pixel 26.

FIGS. 13A to 13C are views explaining the rotational error of the split image prism 16. A shown arrow direction F represents a direction of a pixel column.

This countermeasure is taken when assembling error causes an error between the direction of the pixel column of the light receiving section and the splitting direction of the split image prism.

Now, it is assumed that as shown in FIG. 13A, the split portion is oblique with respect to two images 36. In this case, there is a possibility of misunderstanding that video signal components of the adjacent sensor arrays are signals where three image signals are obtained and there is no deviation as shown in FIG. 13B even if the images 36 are actually deviated from each other.

Thus, video signal components of two sensor arrays at intervals of predetermined lines, two lines in this case, are obtained. FIG. 13C shows the components of the video signals obtained in this way, and it can be understood that they are deviated left and right.

Figure 14:
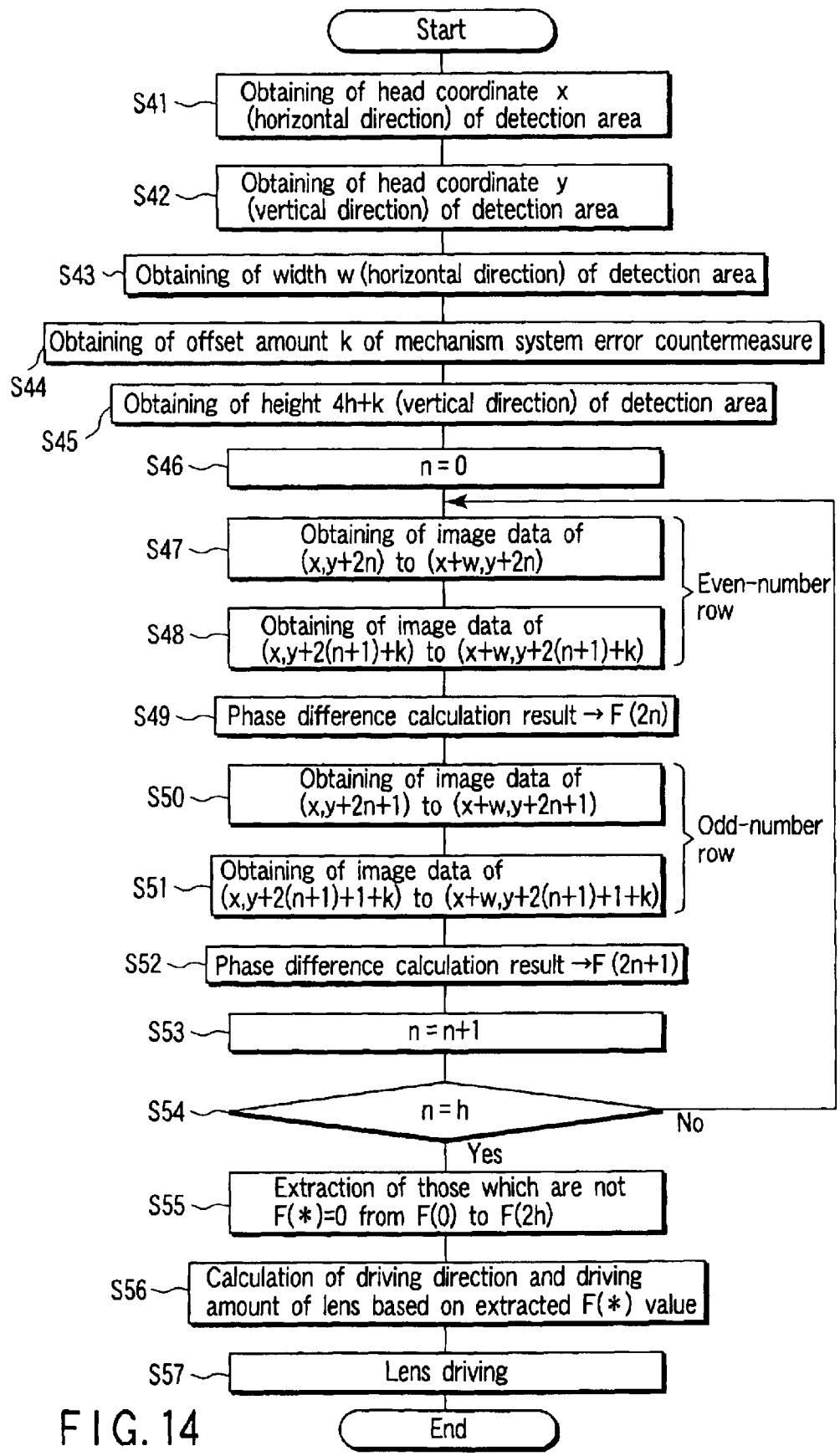
FIG. 14 is a flowchart explaining a focusing operation carried out by considering the rotational error of the split image prism.

Next, description will be made of the focusing operation which considers the rotational error of the split image prism by referring to a flowchart of FIG. 14. This operation is controlled by the control section 24.

In the focusing operation, first, in step S41, a head coordinate x in a horizontal direction of a detection area 40 in the valid pixel 26 is obtained. Simultaneously, in step S42, a head coordinate y in a vertical direction of the detection area 40 is obtained. Further, in step S43, a width w in the horizontal direction of the detection area 40 shown in FIG. 9 is obtained.

Then, in step S44, an offset amount k which is an error countermeasure of the mechanism system (third driving section 22) is obtained. In step S45, a height 4 h+k in the vertical direction of the detection area 40 is obtained. Further, in step S46, 0 indicating a first line of the sensor array in the value pixel 26 is set to n.

Then, in step S47, image data from x of y+2n row to x+w are obtained. Subsequently, in step S48, image data from x of y+2(n+1)+k row to x+w are obtained. Thus, image data of even-number rows in the detection area 40 are obtained. Then, in step S49, phase difference calculation is carried out based on the image data obtained in steps S47 and S48, and its result is written in a storage area F(2n) of a not-shown memory section.

In step S50, image data from x of y+2n+1 row to x+w are obtained. Subsequently, in step S51, image data from x of y+2(n+1)+1+k row to x+w are obtained. Thus, image data of odd-number rows in the detection area 40 are obtained. Then, in step S52, phase difference calculation is carried out based on the image data obtained in steps S50 and S51, and its result is written in a storage area F(2n+1) of the not-shown memory section.

Then, in step S53, after a value of n is incremented, the value of n is determined in step S54. The image data of totally four rows, i.e., two rows each of the even-number and odd-number rows, have been obtained in steps S47, S48, S50, S51. Thus, if reaching to the height h for the four rows is determined, it means that determination is made for all the rows (height 4h) in the detection area 40. Therefore, the process of steps S47 to S54 is repeated until n=h is reached (YES) in step S54.

Then, if all the image data in the detection area 40 have been obtained, the process moves to step S55, where F(*) which is not 0 is extracted from F(0) to F(2 h). Thus, in step S56, based on a value of the F(*) extracted in step S55, a driving direction and a driving amount of the lens are calculated.

F(*) is set to 0 in the case of a predetermined amount or lower. The predetermined amount is a value preset based on a noise level. This is excluded in the case of a calculation error.

In step S57, the taking lens is driven based on the calculated driving direction and amount to execute focusing.

Though not shown, if an out-of-focus amount (defocusing amount) is too large, no clear video signals are obtained, which may make it impossible to detect the deviation amount of the video signals. In this case, the following countermeasures may be employed. One is lens scanning which is a general and well-known technology in the contrast system (mountain climbing system) and the phase difference system. The other is detection by diaphragmming the optical system so as to obtain clear video signals even if the out-of-focus amount (defocusing amount) is large.

In FIG. 1, the split image prism is moved in the arrow direction A. However, the movement is not limited to this, and it may be inserted into/pulled out from the light receiving section 14.

Next, the second embodiment will be described.

In the foregoing first embodiment, the split image prism 16 is arranged on the light receiving surface of the light receiving section 14 so as to be inserted/pulled out by the first driving section 18. According to the second embodiment, optical paths are switched between AF time and photographing time by deflection means.

Figure 15:
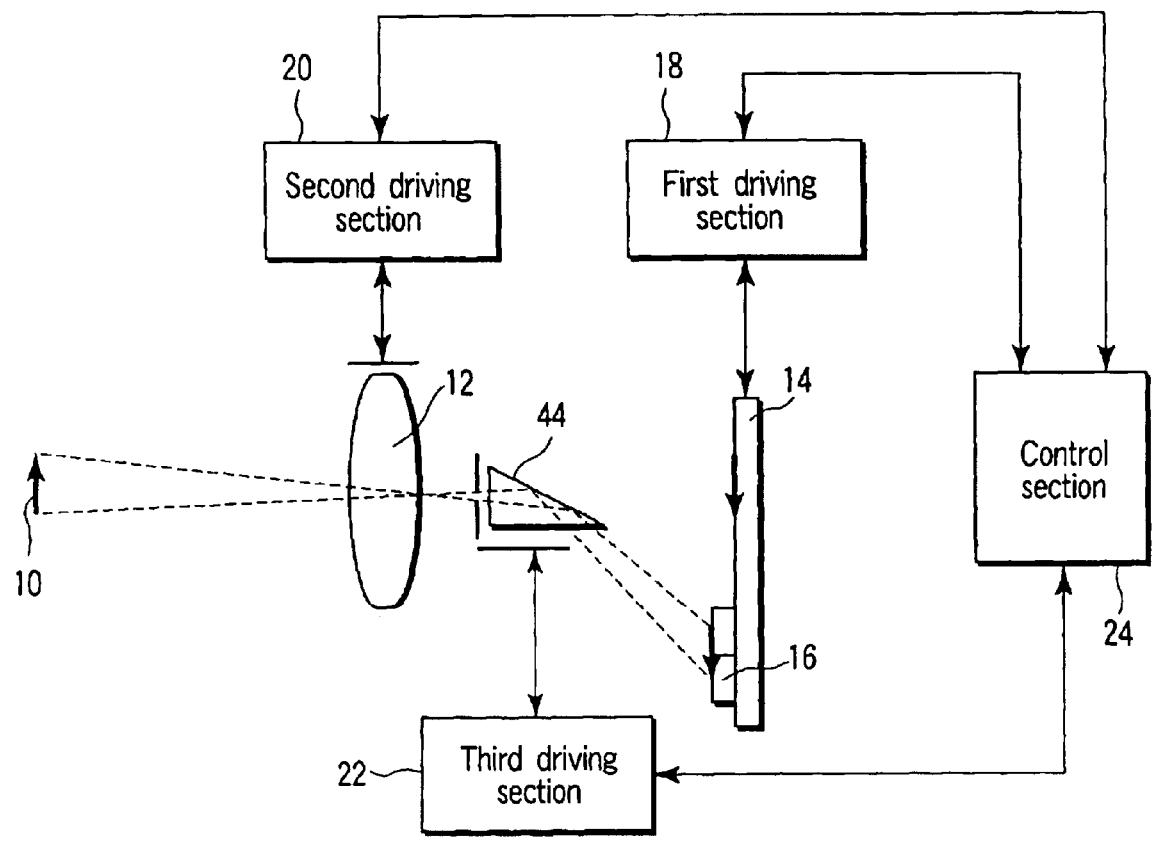
FIG. 15 is a block diagram showing a basic configuration of an auto focusing system according to a second embodiment of the present invention.

FIG. 15 is a block diagram showing a basic configuration of an auto focusing system according to the second embodiment of the present invention.

In FIG. 15, a photographing luminous flux from an object 10 is guided through an optical section 12 and a deflection section 44 to a light receiving section 14. The light receiving section 14 and the optical section 12 are controlled to be driven by a control section 24 through a first driving section 18 and a second driving section 20.

Between the optical section 12 and the light receiving section 14, the deflection section 14 which can switch optical paths is arranged. This deflection section 44 is controlled by the control section 24 through a third driving section 22. It is inserted into the optical path at AF time, and retreated out of the optical path at photographing time.

Figure 16:
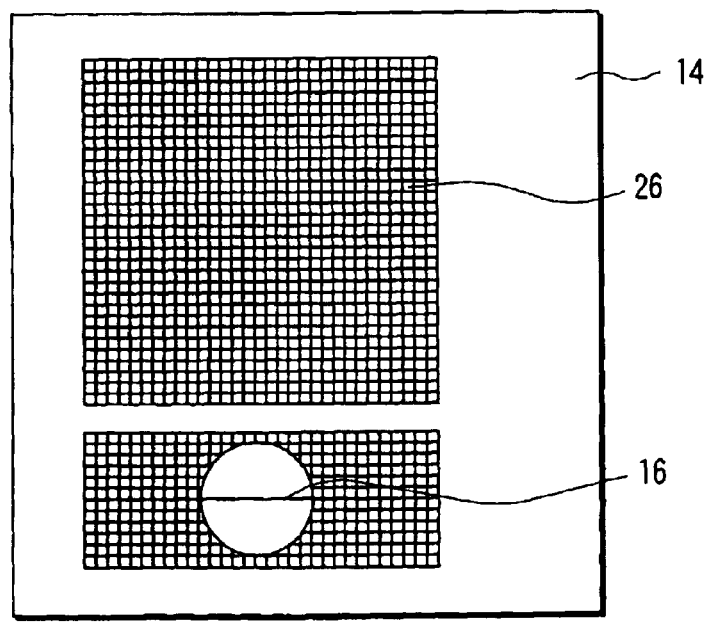
FIG. 16 is a top view showing a position of a split image prism 4 on a light receiving section 3 in the second embodiment of the present invention.

FIG. 16 is a top view showing a position of the split image prism 16 on the light receiving section 14.

The light receiving section 14 has a plurality of valid pixels 26 and, at AF time, the deflection section 44 is arranged in the optical path to deflect a luminous flux form the object 10 to the side where the split image prism 16 is arranged. On the other hand, during photographing, the deflection section 44 is retreated out of the optical path, and thus the luminous flux from the object is guided to the valid pixel 26.

Thus, the used light receiving area at the AF time and the used light receiving area at the photographing time are different from each other. One of the arraying directions (longitudinal or horizontal) of the pixels and the splitting direction of the split image prism are roughly equal to each other.

The split image prism of each embodiment is not limited to the foregoing. Any optical member is used as long as it has a similar function.

In FIG. 16, a pixel between the valid pixels becomes invalid (OB(=Optical Black) pixel, but such a pixel may not be necessary.

Further, according to the second embodiment, though not shown, an offset amount becomes a difference in optical path length between presence and nonpresence of the deflection section 44.

Regarding an adjustment value, it may be a difference in the driving amount of the optical section between use of the contrast system and use of the split image prism.

Next, a third embodiment of the present invention will be described.

Figure 17:
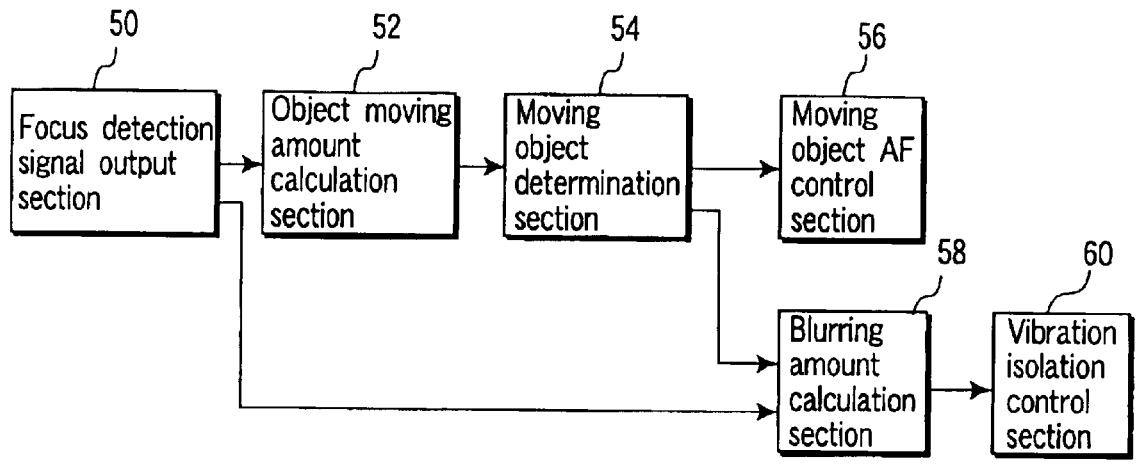
FIG. 17 is a view showing a schematic constitution of a camera where a blurring detection and moving object predicting technology is applied to an auto focusing system of a third embodiment of the present invention.

FIG. 17 is a schematic configuration view showing an example of applying a technology of blurring detection and moving object prediction to an auto focusing system which has a plurality of focus detection areas according to the third embodiment of the present invention. Other than members shown in FIG. 17, functions and components which a normal camera has are provided though not described here.

This camera comprises a focus detection signal output section (focus detection sensor) 50 for outputting a focus detection signal, an object moving amount calculation section 52, a moving object determination section 54, a moving object AF control section 56, a blurring amount calculation section 58, and a vibration isolation control section 60.

The object moving amount calculation section 52 calculates an object moving amount based on a focus detection signal obtained from the focus detection signal output section 50. The moving object determination section 54 determines movement of the object based on the object moving amount output of the object moving amount calculation section 52.

The moving object AF control section 56 drives and controls the taking lens to focus on the moving object in a focus detection area where the moving object is present. The blurring amount calculation section 58 calculates a blurring amount of a photographer based on the output of the focus detection signal output section 50 in a focus detection area where the moving object is not present (object is stationary).

Further, the vibration isolation control section 60 executes control to prevent an influence of blurring of the photographer on a photograph based on the obtained blurring amount.

By such a configuration, in the focus detection area where the moving object is detected, the object moving amount is calculated to execute moving object AF control based on the focus detection signal. In the focus detection area where the moving object is not detected, the blurring amount is calculated to execute vibration isolation control based on the focus detection signal.

Figure 18:
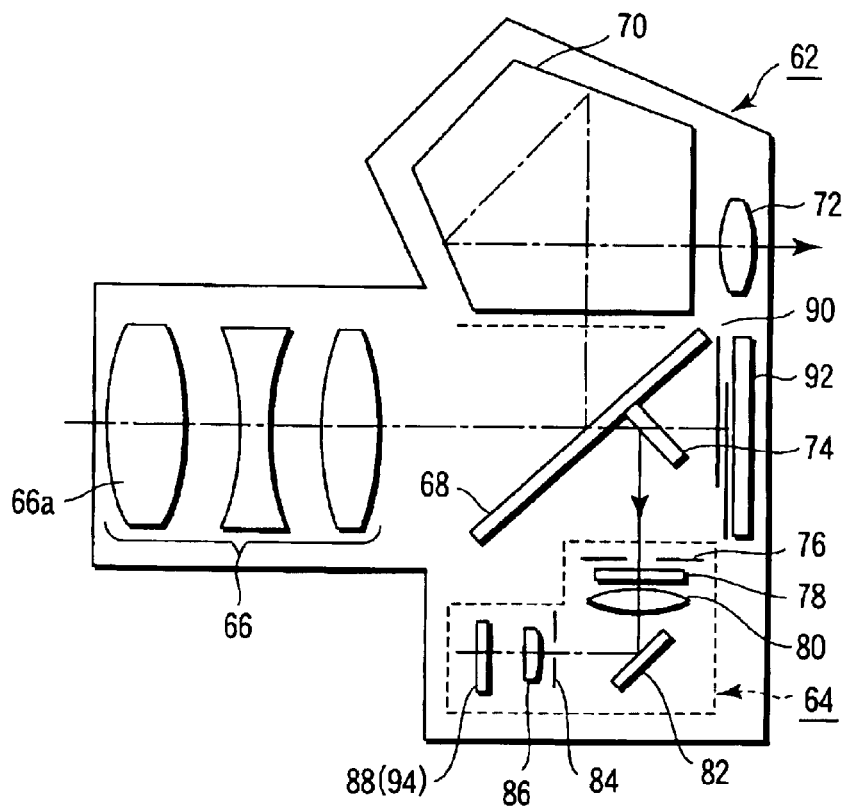
FIG. 18 is a sectional view of a constitutional example where the camera of the third embodiment is applied to a single lens reflex digital camera.

FIG. 18 is a sectional view showing a constitutional example of applying the auto focusing system to a single lens reflex digital camera.

This digital camera comprises a focus detection section 64 for detecting a focus in the lower side of a camera body 62. At normal time, a luminous flux passed through a taking lens 66 (object image) is partially reflected on an upper finder 72 side by a main mirror 68, and a remaining luminous flux is transmitted straight. The luminous flux reflected by the main mirror 68 is guided through a pentaprism 70 to the finder 72 to be seen by an eye of an observer as a photographing screen. On the other hand, the luminous flux transmitted through the main mirror 68 is branched downward by a submirror 74 integrally attached to the main mirror 68 to be guided to the focus detection section 64.

The focus detection section 64 comprises a visual field mask 76 for diaphragmming the luminous flux passed through the taking lens 66, an infrared ray cut filter 78 for cutting off an infrared ray component, a condenser lens 80 for condensing the luminous flux, a total reflection mirror 82 for totally reflecting the luminous flux, a pupil mask 84 for limiting a passing amount of the luminous flux, an image re-forming lens 86 for re-forming an image of the luminous flux on a photoelectric transducer group 94 on an area sensor 88, and the area sensor 88 constituted of the photoelectric transducer group 94 and its processing circuit.

In such a digital camera, during photographing, the main mirror 68 and the submirror 74 are raised to a shown position indicated by a broken line to be retreated. Then, a shutter 90 is opened for predetermined time, and an image of the luminous flux passed through the taking lens 66 (object image) is formed on an image pickup device 92 such as a CCD image sensor or a MOS image sensor.

Figure 19:
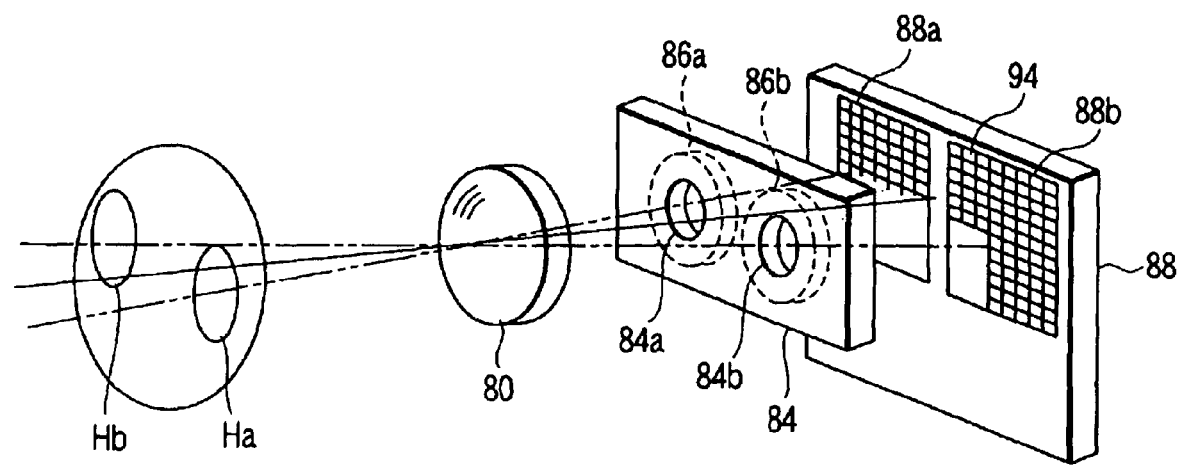
FIG. 19 is a view schematically showing an optical system in a focus detection section of the camera of the third embodiment.

FIG. 19 is a view schematically showing an optical system in the camera focus detection section 64.

In this focus detection optical system, the taking lens 66, the condenser lens 80, and the pupil mask 84 which has openings 84a, 84b arranged roughly symmetrically with respect to an optical axis of the taking lens 66 are disposed in an optical path. Further, image re-forming lenses 86a, 86b are disposed in rear sides corresponding to the openings 84a, 84b. In FIG. 19, the aforementioned total reflection mirror 82 is omitted.

By such a constitution, in an area Ha of the exit pupil of the taking lens 66, the object luminous flux passed through Hb to be made incident is sequentially passed through the condenser lens 80, the openings 84a, 84b of the pupil mask 84, and the image re-forming lenses 86a, 86b. Then, a first image and a second image are formed again on the photoelectric transducer group 94 of two areas 88a, 88b where many photoelectric transducers are arrayed in the area sensor 88.

By detecting and measuring a space between the first image and the second image, it is possible to detect a focusing state of the taking lens 66 including prefocus and post focus. Specifically, a light intensity distribution of the first image and the second image is obtained based on an output of object image data corresponding to the area sensor 88 (openings 88a, 88b) to enable measurement of the space between the two images.

Figure 20:
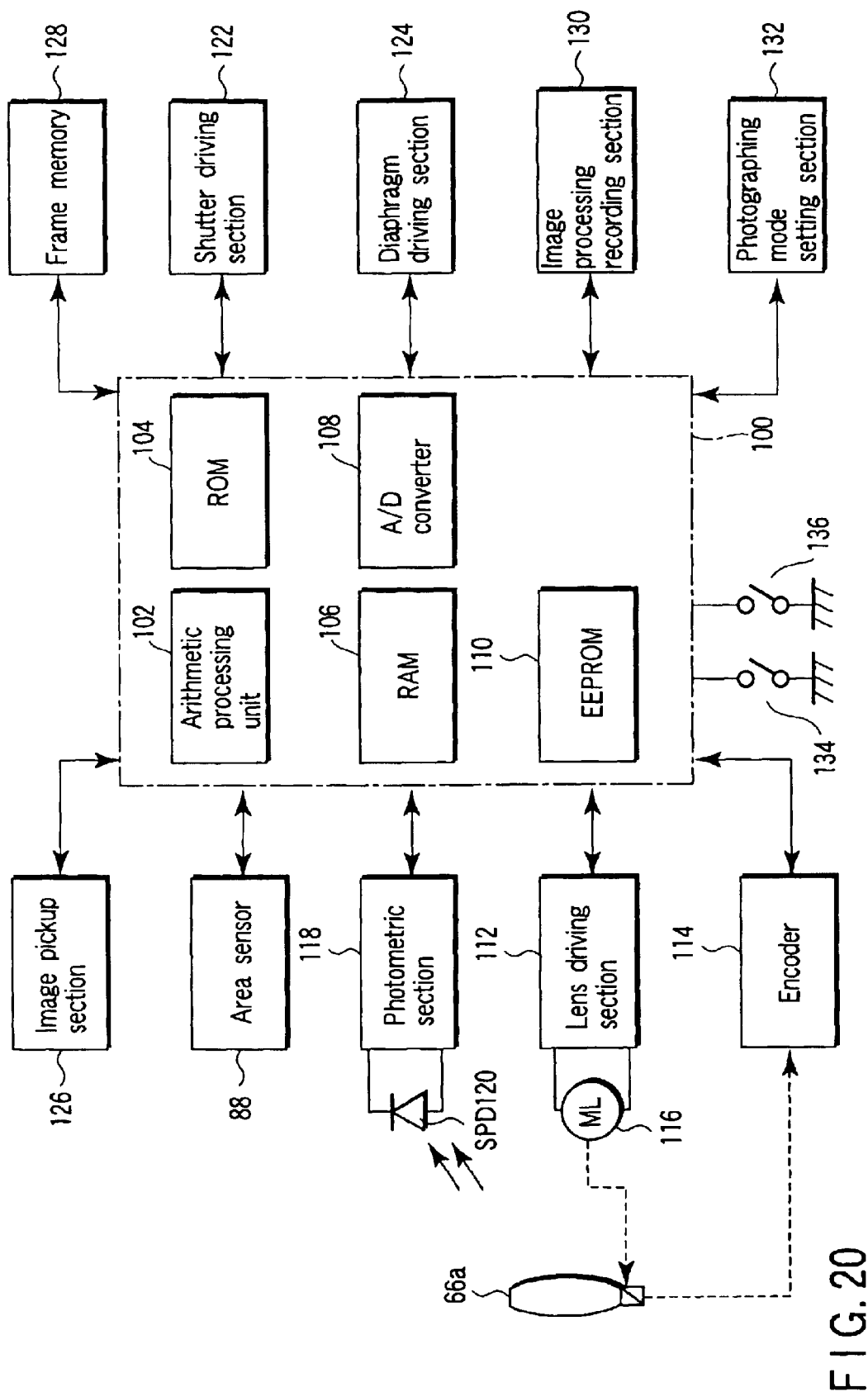
FIG. 20 is a view showing a function block which includes an electric control system of the camera shown in FIG. 18.

FIG. 20 shows a functional block which includes an electric control system of the digital camera described above with reference to FIG. 18. Hereinafter, a constitution and an operation of each section will be described in detail.

In this constitution, a control section 100 is in general control of the entire camera, which comprises an arithmetic processing section 102 constituted of, e.g., a CPU, a ROM 104, a RAM 106, an A/D converter 108, and an EEPROM 110 inside.

The control section 10 controls a series of operations of the digital camera in accordance with a camera sequence program (detailed later) stored in the ROM 104. In the EEPROM 110, correction data regarding AF control, photometry etc., can be stored and saved as intrinsic information for each camera body. Further, the area sensor 88, a lens driving section 112, an encoder 114, a photometric section 118, a shutter driving section 122, a diaphragm driving section 124, an image pickup section 126, a frame memory 128, an image processing recording section 130, and a photographing mode setting section 132 are connected to the control section 100 so as to communicate with the same. Reference numerals 134 and 136 denote a first release switch (1RSW) and a second release switch (2RSW) coupled with a release button (not shown) of the camera.

In such a constitution, the lens driving section 112 drives a focusing lens 66a of the taking lens 66 by a motor ML116 based on control of the control section 100. At this time, the encoder 114 generates a pulse in accordance with a moving amount of the focusing lens 66a, and sends it to the control section 100 to properly control lens driving.

The photometric section 118 has a silicon photodiode (SPD) 120 corresponding to a photographing area, and generates an output in accordance with luminance of the object. The control section 100 converts a photometry result of the photometric section 118 into a digital signal by the A/D converter 108, and stores a photometry value thereof in the RAM 106.

The shutter driving section 122 and the diaphragm driving section 124 are operated by predetermined control signals from the control section 100 to drive a shutter mechanism and a diaphragm mechanism which are not shown. The image pickup section 126 including the image pickup device 92 temporarily stores image data obtained by image formation on the image pickup device 92 in the frame memory 128, and executes image processing of an image recorded or displayed on a not-shown display section by the image processing recording section 130.

The photographing mode setting section 132 is a switch group to enable the photographer to set various photographing modes, which includes an moving object AF mode switch for photographing a moving object, and a vibration isolation mode switch for reducing an influence of blurring.

As described above, the first release switch 134 and the second release switch 136 are switches coupled with the release button. A first-state depressing operation of the release button first turns ON the first release switch 134, and a subsequent second-stage depressing operation turns ON the second release switch 136. The control section 100 controls each section properly such that photometry and AF (automatic focusing) are executed by the turning-ON of the first release switch 134 and, by the turning-ON of the second release switch 136, an image forming operation is carried out by the image pickup section 126, image data is temporarily stored, and a recording operation is carried out by the image processing recording section 130.

FIGS. 21A and 21B show an arrangement example of ranging areas constituting a focus detection area in a photographing screen, and an example of a moving object. Here, FIG. 21A shows the arrangement example of the ranging areas when an entire area of the area sensor 88 is divided into 15 areas. As shown, from a point P to a point P15, multipoint focus detection areas of the 15 areas are arranged.

FIG. 21B shows an example where these points P1 to P15 are applied to an actual moving object.

The area sensor 88 shown in FIG. 20 is constituted of a sensor such as a CCD or a MOS which has a photodiode array. For charge storage control of the photodiode of the 15 areas, charge storage (integration) is started in all the areas all at once. However, a not-shown charge integration circuit is disposed to enable integration and stoppage by a proper charge storage amount independently.

$E_A$ to $E_H$ lines shown in FIG. 21A correspond to $E_A$ to $E_H$ lines shown in FIG. 21B. In positions corresponding to intersections of the lines shown in FIG. 21B, there are focus detection areas of the 15 areas described above with reference to FIG. 21A, and focus detection signals of the object corresponding to the positions are outputted.

In this example, in 5 areas of P1, P6, P7, P11, P12, a stationary object such as a background of a train or the like is imaged, and no moving object prediction AF is carried out in these areas. As causes of difference of data (sensor data) obtained from object images imaged by different timings, there are two cases: by movement of the object and by blurring of the photographer.

Thus, in these 5 areas, the images imaged by the different timings differ if blurring of the photographer. By using this, the blurring can be detected.

In the other 10 areas, the train which is a moving object is imaged. In these areas, since moving object detection is executed, moving object prediction AF is carried out based on a moving object detection result of an area selected in accordance with a predetermined algorithm. No blurring detection is carried out in such an area of moving object prediction.

Figure 22A:
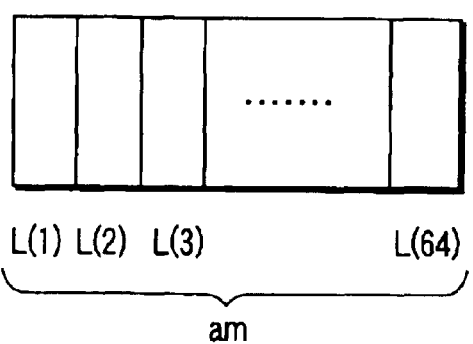
FIGS. 22A and 22B show a linear arrangement of a photodiode array corresponding to one focus detection area.
Figure 22B:
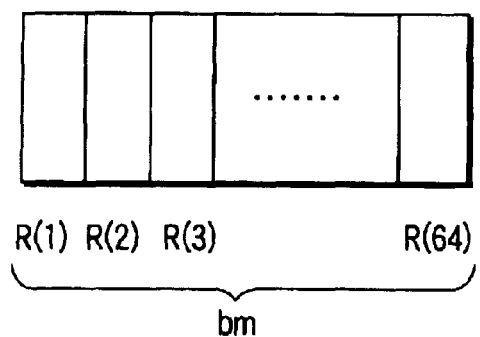

FIGS. 22A and 22B are views showing linear arrangement of a photodiode array corresponding to one focus detection area.

A photodiode array am constituting an area sensor 88a shown in FIG. 22A has 64 pixels represented by L(1) to L(64). These object signals are sequentially subjected to A/D conversion by the A/D converter 108, and stored in the RAM 106. A photodiode array ban constituting an area sensor 88b shown in FIG. 22B has 64 pixels represented by R1) to R(64). These object signals are sequentially subjected to A/D conversion by the A/D converter 108, and stored in the RAM 106.

That is, one area is constituted of 64×2 pixels, and each area is independent, and integration-controlled to be a proper integration amount. For such an area, 15 areas are set as shown in FIG. 21A.

Next, description will be made of AF detection calculation based on the object image data obtained in the foregoing manner.

For example, according to the third embodiment, there are two kinds of correlation calculation methods. One is a method which carries out correlation calculation between a first object image (image by the area sensor 88a shown in FIG. 22A) and a second object image (image by the area sensor 88b shown in FIG. 22B) divided by the focus detection optical system to obtain a deviation amount between the two images (referred to as "image deviation amount"). The other is a method which carries out correlation calculation between an object image at time $t_0$ and an object image at time $t_1$ to obtain a moving amount of the object image.

(1) Correlation Calculation for Obtaining Image Deviation Amount

First, description will be made of correlation calculation for obtaining an image deviation amount between the first object image and the second object image. Object image data can be generally represented by L(i, j), R(i, j) with respect to the pair of area sensors 88a, 88b.

Figure 23:
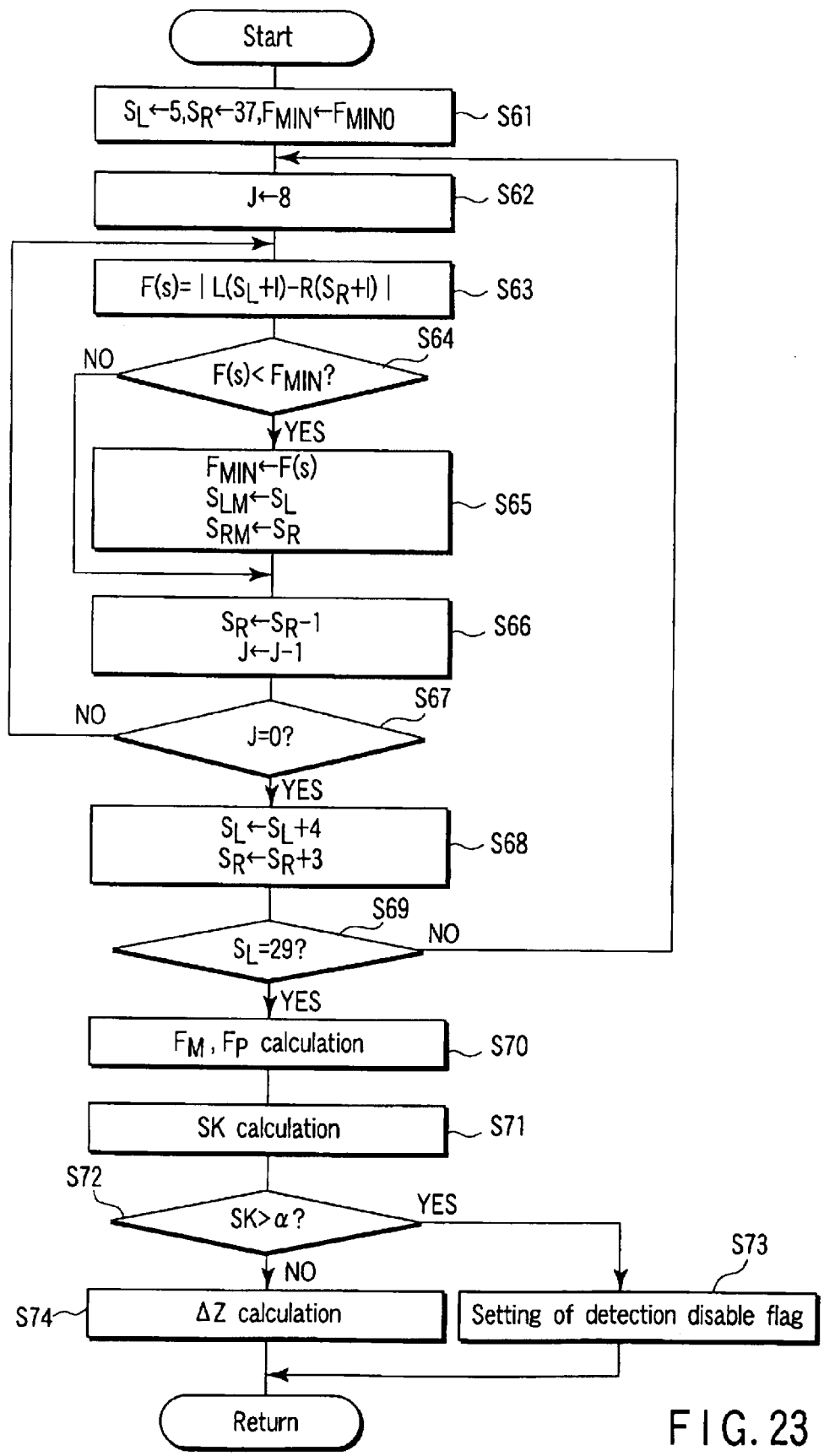
FIG. 23 is a flowchart explaining a process regarding an "image deviation amount detection" routine.

In the description below, to facilitate understanding, a pair of ranging areas corresponding to the area sensors 88a, 88b, i.e., one-dimensional object image data, are L(I), R(I) (I=1 to k) (see FIGS. 22A, 22B). Now, a process of an "image deviation amount detection" routine of the embodiment will be described by referring to a flowchart of FIG. 23 where k=64 is assumed.

First, in step S61, initial values of variables $S_L$, $S_R$ and $F_{MIN}$ are set. Here, $S_L \leftarrow 5$, $S_R \leftarrow 37$, $F_{MIN} = F_{MINO}$ are set.

Then, in step S62, 8 is entered as an initial value of a loop variable J. Further, in step S63, correlation calculation of the following equation (1) is executed to obtain a correlation value (s):

$$F(s) = \Sigma |L(S_L + I) - R(S_R + I)| \tag{1}$$

(wherein $s = S_L - S_R$, I=0 to 26)

The variables $S_L$, $S_R$ indicate head positions of blocks to be subjected to correlation calculation of the object image data L(I), R(I), J a variable for storing a block shifting number of times on the object image data R(I), and the number of block object image data is 27.

Then, in step S64, a correlation value F(s) is compared with $F_{MIN}$ (first the initial value $F_{MINO}$, and the initial value or an updated value second time and after). In this comparison, if F(s) is smaller (YES), the process moves to step S65, where the $F_{MIN}$ is updated to F(s), and $S_{LM}$, $S_{RM}$ are updated to $S_L$, $S_R$.

On the other hand, in the comparison of step S64, if $F_{MIN}$ is smaller than the correlation value F(s) (NO), the process skips step S65 to move to step S66, where 1 is subtracted from $S_R$, j to set a next block (step S6). In subsequent step S67, determination is made as to j=0.

If a result of the determination is that it is not yet 0 (NO), the process moves to step S63 to repeat similar correlation calculation. Thus, the block of the object image data L(I) is fixed, and the block of the object imager R(I) is shifted by one element to carry out correlation calculation.

On the other hand, if J is 0 (YES) in the determination of step S67, the process moves to step S68, where 4, 3 are respectively added to the variables $S_L$, $S_R$, and a next block is set as a target.

Then, in step S69, determination is made as to $S_L = 29$. Here, if $S_L = 29$ is not determined (NO), the process moves to step S62 to continue the correlation calculation. However, if $S_L = 29$ is determined (YES), the correlation calculation is finished.

Thus, blocks are set on the object image data L(I), R(I) for correlation calculation, and the correlation calculation is repeatedly carried out. An obtained result of the correlation calculation of the blocks is that the correlation value F(s) becomes minimum at a shifting amount s=x where the correlation of the object image data is highest. At this time, $S_L$, $S_R$ of the time of this minimum correlation value F(x) are stored in $S_{LM}$, $S_{RM}$.

Then, in step S70, the following correlation values $F_M$, $F_P$ are obtained in shifting positions before and after the minimum correlation value F(x) used when a later-described reliability index is calculated:

$$F_M = \Sigma |L(S_{LM} + l) - R(S_{RM} + l - 1)| (l = 0 \text{ to } 26) \tag{2}$$

$$F_P = \Sigma |L(S_{LM} + l) - R(S_{RM} + l + 1)| (l = 0 \text{ to } 26) \tag{3}$$

Then, in step S71, a reliability index SK is calculated to determine reliability of the correlation calculation. This reliability index SK is a numerical value where a sum of the minimum correlation value F(x) and a second smallest correlation value $F_P$ (or $F_M$) is standardized by a value ($F_M - F(x)$ or $F_P - F(x)$) equivalent to contrast of the object data, and obtained by the equation (4) or (5):

$$SK = \frac{F_{(x)} + F_P}{F_M - F_{(x)}} \text{ (wherein } F_P < F_M) \tag{4}$$

$$SK = \frac{F_{(x)} + F_M}{F_P - F_{(x)}} \text{ (wherein } F_P \geq F_M) \tag{5}$$

Then, in step S72, determination is made as to whether the reliability index SK is equal to/higher than a predetermined value $\alpha$. Here, if SK is equal to/higher than $\alpha$ (YES), low reliability is determined, and the process moves to step S73 to set a detection disable flag. On the other hand, if SK is less than $\alpha$ (NO), it is determined that there is reliability, and the process moves to step S74 to calculate an image deviation amount $\Delta Z$. For example, a 3-point interpolation method is used, and a shifting amount $x_0$ which gives a minimum value $F_{MIN} = F(x_0)$ with respect to a continuous correlation amount is obtained by the following equations:

$$x_0 = S_{RM} - S_{LM} + \frac{F_M - F_P}{2(F_M + F_{(x)})} \text{ (wherein } F_M \geq F_P) \tag{6}$$

$$x_0 = S_{RM} - S_{LM} + \frac{F_P - F_M}{2(F_P + F_{(x)})} \text{ (wherein } F_M < F_P) \tag{7}$$

By using the shifting amount $x_0$, the image deviation amount $\Delta Z$ can be obtained by the following equation (8):

$$\Delta Z = x_0 - \Delta Z_0 \tag{8}$$

(wherein $\Delta Z_0$ is an image deviation amount at focusing)

From the image deviation amount $\Delta Z$ obtained from the above equation, a defocusing amount $\Delta D$ with respect to a scheduled focusing surface of the object image surface can be obtained by the following equation (9):

$$\Delta D = \frac{B}{A - \Delta Z} + C \tag{9}$$

(wherein A, B, C are each a constant decided by the focus detection optical system)

For a plurality of ranging areas selected in the aforementioned manner, defocusing amounts are calculated. Then, for example, from a plurality of ranging areas, a defocusing amount indicating a shortest distance is selected.

Further, from the selected defocusing amount $\Delta D$, a lens driving amount $\Delta L$ is obtained by the following equation (10):

$$\Delta L = b - \frac{a \cdot b}{a + \Delta D} + C \cdot \Delta D \tag{10}$$

(wherein a, b, c are each a constant decided by the photographing optical system)

Then, based on the lens driving amount $\Delta L$, focus lens driving is carried out to obtain a focused state.

Now, description will be made of a principle of focus detection for the moving object shown in FIGS. 24A to 24D.

Figure 24A:
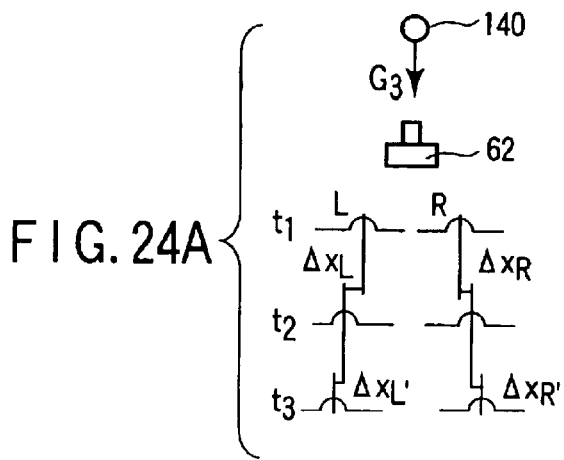
FIGS. 24A to 24D are for explaining a principle of focus detection of a moving object.
Figure 24B:
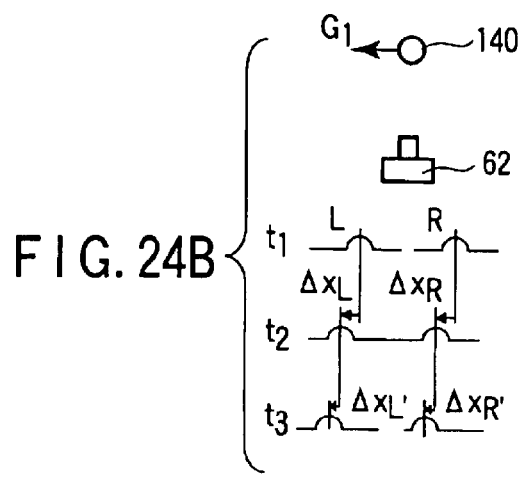

Considering a relation among an object 140, the digital camera 62 and the area sensor 88, for example, as shown in FIG. 24A, if the object 40 approaches straight to the camera 62 (direction of an arrow $G_3$), by the aforementioned focus detection principle, the first and second object images on the first and second sensors (L) and (R) are moved to the outside from time $t_0$ to time $t_1$. In this case, the moving amounts $\Delta x_L$ and $\Delta x_R$ of the object images are equal to each other.

Figure 24C:
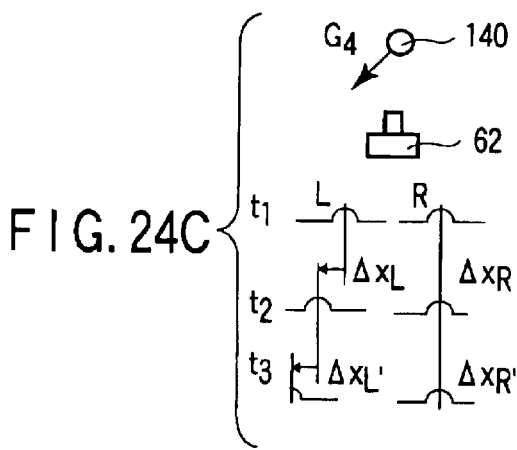

Further, as shown in FIG. 24C, if the object 140 approaches near the left front of the digital camera 62 (direction of an arrow $G_4$), the moving amount to the outside by approaching and the moving amount to the left side by left parallel movement cancel each other to reduce the moving amount of the first object image (L).

Figure 24D:
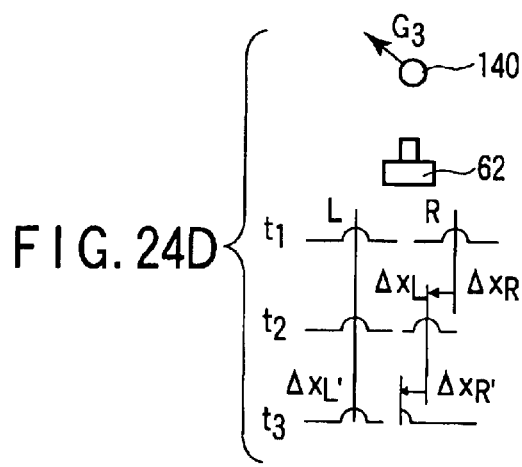

Similarly, as shown in FIG. 24D, if the object 140 is moved away to the left rear side of the digital camera 62, the moving amount to the inside by moving-away and the moving amount to the left side by left parallel movement cancel each other to reduce the moving amount of the first object image (L). On the other hand, the moving amount to the inside by moving-away and the moving amount to the left side by left parallel movement are added to increase the moving amount.

Here, if based on the object images from the time $t_0$ to the time $t_1$, by later-described means for executing correlation calculation or the like, the moving amounts $\Delta x_L$, $\Delta x_R$ of the first and second object images are detected to impart codes where right movement is "+", a moving amount of the object image in an optical axis direction can be obtained by $\Delta x_R - \Delta x_L$, and a moving amount of the object image in a horizontal direction can be obtained by $\Delta x_R + \Delta x_L$. Thus, by obtaining the moving amounts $\Delta x_R$, $\Delta x_L$ of the object images from the time t0 to the time t1, it is possible to predict positions of the object images at time $t_2$.

If the objects move at constant speeds, a moving speed of the object image in the horizontal direction becomes a constant speed. A moving speed of the object image in the optical axis direction does not become a constant speed strictly, but it may be considered to be a constant speed at a very small time interval.

Therefore, a predicted position of the first object image at the time $t_0$ is moved from the object image position of the time $t_1$ by $\Delta x_L'$ represented by the following equation (11): that is, $$\Delta X_L' = \frac{t_2 - t_1}{(t_1 - t_0)} \cdot \Delta X_L \quad (11)$$

Similarly, a predicted position of the second object image is moved by $\Delta x_R'$ represented by the following equation (12):

$$\Delta X_R' = \frac{t_2 - t_1}{t_1 - t_0} \cdot \Delta X_R \quad (12)$$

If an image deviation amount between the first and second object images at the time $t_1$ is $\Delta Z$, a predicted image deviation amount $\Delta Z'$ at the time $t_2$ is obtained by the following equation (13):

$$\Delta Z' = \Delta Z + (\Delta X_R' - \Delta X_L') \quad (13)$$
$$= \Delta Z + \frac{t_2 - t_1}{t_1 - t_0}(\Delta X_R - \Delta X_L)$$

Then, based on the predicted image deviation amount $\Delta Z'$, a lens driving amount is obtained. By setting the time $t_2$ as time until a start of exposure, it is possible to obtain a focused photograph of the moving object. At this time, by a code of $\Delta x_R - \Delta x_L$, determination is made as to whether the object approaches or moves away. If the result shows $\Delta x_R - \Delta x_L > 0$, it means that the object approaches.

Next, description will be made of correlation calculation for obtaining movement of the object image and determination of its reliability.

Object images L'(I), R'(I) at the time $t_0$, correlation blocks $S_{LM}'$, $S_{RM}'$ obtained by the aforementioned correlation calculation between the two images, a correlation coefficient SK', and an image deviation amount $\Delta Z'$ are stored in the RAM 106 in the control section 100. Then, object image signals L(I), R(I) at the time $t_1$ are detected.

Figure 25A:
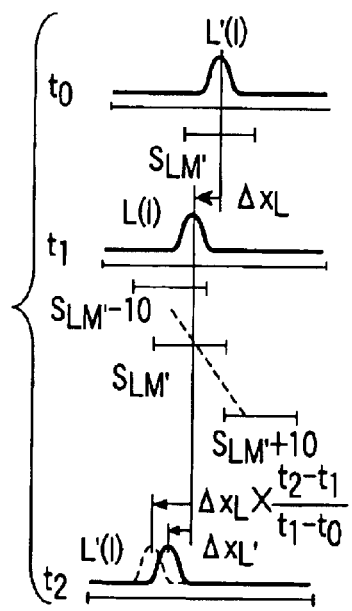
FIGS. 25A and 25B are for explaining movement of an object image for moving amount detection.
Figure 25B:
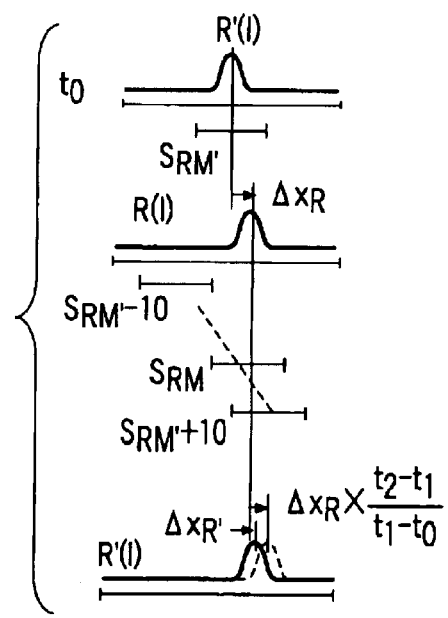
Figure 26:
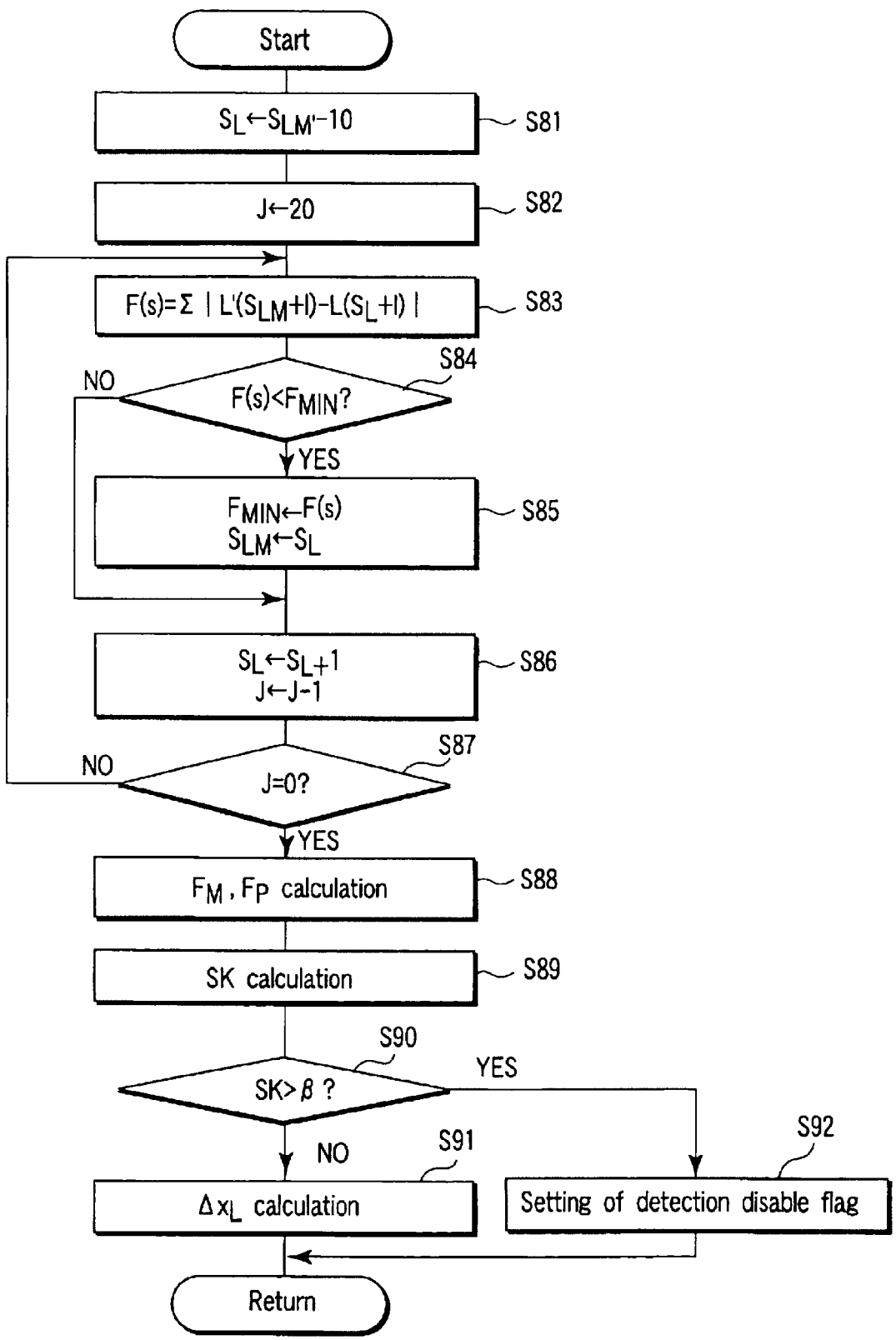
FIG. 26 is a flowchart explaining moving amount detection.

Next, moving amount detection will be described by referring to movement of the object image shown in FIGS. 25A and 25B, and a flowchart of FIG. 26.

First, for the first object imager signal L(I), correlation calculation is carried out between the object image signal L'(I) of the time $t_0$ and the object image signal L(I) of the time $t_1$. In step S81, first, $S_{LM}'-10$ is substituted for a variable $S_L$ in the "moving amount detection" routine for detecting movement of the object image. A variable J is for counting a correlation range and, in step S82, 20 is substituted for this as an initial value.

Then, in step S83, a correlation output F(s) is calculated by the following correlation equation (14):

$$F_{(S)} = \Sigma |L'(S_{LM}' + l) - L(S_L + J + l)| \quad (14)$$

(wherein l=0 to 26)

Subsequently, in step S84, as in the case of the aforementioned correlation calculation, F(s) is compared with $F_{MIN}$. In this comparison, if F(s) is smaller than $F_{MIN}$ (YES), the process moves to step S85, where F(s) is substituted for $F_{MIN}$, and $S_L$ is stored in $S_{LM}$. In this case, the number of block elements to be correlated is 27, which is equal to the number of block elements for obtaining the image deviation amount. However, if F(s) is larger than $F_{MIN}$ (NO), the process skips S85 to move to step S86.

Then, in step S86, 1 is added to $S_L$ while 1 is subtracted from J. Then, in step S87, determination is determined as to J=0. Here, if J is not 0 (NO), the process moves to step S83, where the correction equation F(s) is repeated until J=0 is set. Thus, the correlation range is changed up to ±10 elements to take correlation, and this correlation range is decided by a moving amount range to be detected. However, in step S87, if J=0 is set (YES), reliability determination is carried out.

That is, in step S88, as in the aforementioned case of obtaining the image deviation amount between the first and second object images, correlation values $F_M$, $F_P$ at shifting amounts before and after a minimum correction value F(x) are obtained by the following equations (15) and (16):

$$F_M = \Sigma |L'(S_{LM}' + l) - L(S_{LM} + l - 1)| \quad (15)$$

(wherein l=0 to 26)

$$F_P = \Sigma |L'(S_{LM}' + l) - L(S_{LM} + l + 1)| \quad (16)$$

(wherein l=0 to 26)

Then, in step S89, a reliability index SK is obtained by the aforementioned equations (4) and (5).

Then, in step S90, determination is made as to SK>β. If the determination shows SK≤β (NO), it is determined that there is reliability, and the process moves to step S91 to obtain a moving amount. The value β is set larger than a determination value α at the time of obtaining the image deviation amount between the first and second object images. Since a waveform is usually deformed when the object moves, there is a big possibility that correlation may be deteriorated.

Then, a moving amount $\Delta x_L$ of the object image is obtained. As in the case of calculating the image deviation amount between the first and second object images, the 3-point interpolation method is employed to obtain it by the following equations (17) and (18):

$$\Delta X_L = S_{LM} - S'_{LM} + \frac{1}{2} \frac{F_M - F_P}{F_M - F_{(x)}} \quad \text{(at time of } F_M \geq F_P\text{)} \quad (17)$$

$$\Delta X_L = S_{LM} - S'_{LM} + \frac{1}{2} \frac{F_M - F_P}{F_P - F_{(x)}} \quad \text{(at time of } F_M < F_P\text{)} \quad (18)$$

On the other hand, if the determination in step S90 shows a relation of SK>β (YES), it is determined that there is no reliability, and the process moves to step S92 to set a detection disable flag.

For the second object images R(I), R'(I), though a detail is omitted, a similar moving amount detection routine is executed to obtain a block position $S_{RM}$, a moving amount $\Delta x_R$ where correlation is highest.

After the moving amounts $\Delta x_L$, $\Delta x_R$ of the first and second object images have been obtained, an image deviation amount $\Delta Z'$ at the time $t_1$, is obtained from the image deviation amount $\Delta Z$ at the time $t_0$ by the following equation (19):

$$\Delta Z' = \Delta Z + \Delta x R - \Delta x L \quad (19)$$

A prediction equation of an image deviation amount $\Delta Z''$ at the time $t_2$ based on the image deviation amount $\Delta Z$ at the time $t_0$ becomes similar to the following equation (20):

$$\Delta Z'' = \Delta Z' + \frac{t_2 - t_1}{t_1 - t_0}(\Delta X_R - \Delta X_L) \quad (20)$$
$$= \Delta Z + \frac{t_2 - t_0}{t_1 - t_0}(\Delta X_R - \Delta X_L)$$

The time $t_2$ is obtained by a later-described method, and the lens is driven only by an amount based on $\Delta Z''$. Accordingly, it is possible to focus the moving object.

If a object image moving speed $v=(\Delta x_R - \Delta x_L)/((t_1-t_0)$ is too large, an image deviation amount is not predicted considering that a detection value is not reliable. Additionally, if the moving speed of the object image is small and a detection error is assumed, the moving speed is set to 0.

(II) Prediction Equation of Image Deviation Amount Prediction Time $t_2$

Next, a description will be made of a method for obtaining image deviation amount prediction time $t_2$.

As described above, the image deviation amount $\Delta Z''$ at the time $t_2$ is obtained by the aforementioned equation (20) based on the image deviation amount $\Delta Z$ a the time $t_1$, and the moving amounts $\Delta x_R$, $\Delta x_L$ of the object images from the time $t_0$ to the time $t_1$.

Now, the time $t_2$ where a focused state is set during exposure is obtained by the equation (21):

$$t_2 = t_1 + t_d + ke \cdot \Delta Z'' + t_e \quad (21)$$

In this equation, $t_d$ denotes time from the time $t_1$ to a start of lens driving, and this value includes the processing time such as the aforementioned correlation calculation or the like in the camera. Here, $k_e$ denotes a variable coefficient to obtain lens driving time proportional to the image deviation amount $\Delta Z''$. A lens driving amount $\Delta L$ is obtained by the equations (9) and (10) based on the image deviation amount $\Delta Z''$. In an area where time image deviation amount $\Delta Z''$ is sufficiently small, since the defocusing amount $\Delta D$ and the lens driving amount $\Delta L$ are made proportional to the image deviation amount $\Delta Z''$ to be approximated, there is no accuracy problem. A code $t_e$ denotes time from the end of lens driving to opening of a shutter screen to start exposure of the image pickup device 92, which includes time for exposure calculation, diaphragm control, mirror raising etc.

By solving the equations (20) and (21), the following equation (22) for obtaining a predicted image deviation amount is derived.

$$\Delta Z'' = \frac{\Delta Z + \frac{t_1 - t_0 + t_d + t_e}{t_1 - t_0}(\Delta X_R - \Delta X_L)}{1 - \frac{k_e}{t_1 - t_0}(\Delta X_R - \Delta X_L)} \quad (22)$$

From this $\Delta Z''$, the lens driving amount $\Delta L$ is obtained by the equations (9) and (10) to execute lens driving, whereby a focused state can be set for the moving object during exposure.

Then, the time $t_2$ for focusing at the end time of lens diving is obtained by the following equation (23):

$$t_2 = t_1 + t_d + ke \cdot \Delta Z'' \quad (23)$$

Similarly, by solving the equations (20) and (23), the following equation (24) is derived.

$$\Delta Z'' = \frac{\Delta Z + \frac{t_1 - t_0 + t_d}{t_1 - t_0}(\Delta X_R - \Delta X_L)}{1 - \frac{k_e}{t_1 - t_0}(\Delta X_R - \Delta X_L)} \quad (24)$$

From this $\Delta Z''$, the lens driving amount $\Delta L$ is obtained by the equations (9) and (10) to execute lens driving, whereby a focused state can be set for the moving object at the end time of the lens driving.

Next, description will be made of a specific operation program of the third embodiment by referring to a flowchart of FIG. 27. It is assumed that an "AF" routine is executed in a later-described main routine.

First, in step S101, an integration operation of the area sensor 88 is executed. After the end of the integration, object image data (referred to as sensor data, hereinafter) is read from the area sensor 88.

Then, in step S102, determination is made as to detection of an object image deviation amount (image deviation amount, hereinafter). If this determination shows nondetection of the image deviation amount (NO), the process moves to step S103, where an image deviation amount is obtained by the aforementioned "image deviation amount detection" routine (see FIG. 23).

In step S103, the image deviation amount is detected for predetermined ranging areas preset on the area sensors 88a, 88b. However, the present ranging areas may be, for example, one or all ranging areas selected by a photographer.

Then, in step S104, determination is made as to end of detection of all image deviations for the predetermined ranging areas. If this determination shows nonend (NO), the process moves to step S103 to detect an image deviation amount of a next ranging area. On the other hand, if the image deviation amounts for all the predetermined ranging areas have been detected (YES), the process moves to step S105, where ranging area selection is carried out based on a predetermined algorithm, e.g., nearest area selection. Hereinafter, selected ranging areas am, bm will be described.

Then, in step S106, determination is made as to impossibility of image deviation amount detection, i.e., whether detection is impossible or not for all the predetermined ranging areas. If this determination shows the possibility of detection (YES), the process moves to step S107 to set an image deviation amount detection enable flag. Further, in step S108, an image deviation amount detection end flag is set.

On the other hand, if the determination in step S106 shows the impossibility of detection for all (NO), the process moves to step S109 to set an image deviation amount detection disable flag. Further, in step S110, the image deviation amount detection end flag is cleared.

Figure 28:
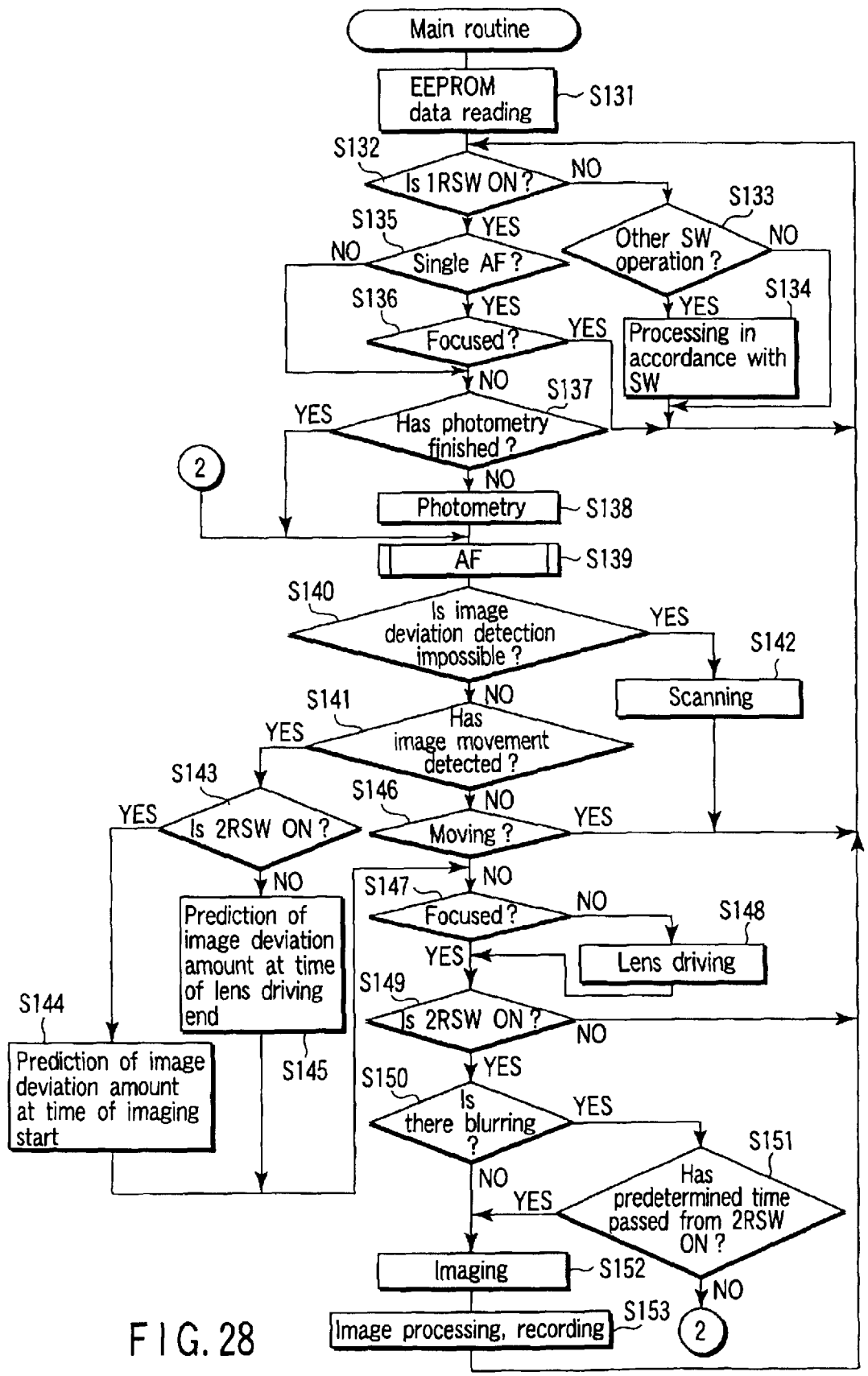
FIG. 28 is a flowchart explaining a main routine of the camera to which a multipoint auto focusing camera is applied.

Then, after the image deviation amount detection end flag is set or cleared in step S108 or S110, the process moves to step S111 to clear the image moving amount detecting end flag, and the process returns to a later-described main routine shown in FIG. 28.

If the determination in step S102 shows that the image deviation amount has been detected (YES), a moving amount of the object image with respect to time is detected for each of the first and second object images.

First, a ranging area am selected in step S105 is set as an initial ranging area in step S112. Then, in step S113, correlation calculation is carried out between sensor data stored by previous (time $t_0$) image deviation amount detection and current (time $t_1$) sensor data for a first object image of the ranging area am, and a moving amount is detected. This is carried out by the moving amount detection routine shown in FIG. 26.

Then, in step S114, determination is made as to whether the moving amount of the first object image has been detected or not. If this determination shows that the moving amount has not been detected (NO), the process moves to step S115, where an image deviation amount between the first and second object images is set to 0, and determination is made as to setting of all ranging areas in the vicinity of the ranging area am.

If this determination shows that shifting has not been finished for all the ranging areas in the vicinity (NO), the process proceeds to step S116, where current (time $t_1$) ranging areas are shifted in accordance with a predetermined order, and shifted to a next ranging area to be set. Then, the process moves to step S113, where the moving amount of the first object image is detected again for the newly set ranging area. In this way, a position of the first object image is searched.

However, if the determination in step S115 shows that setting has been finished for all the ranging areas in the vicinity (YES), the process moves to later-described step S119.

If the determination in step S114 shows that the position of the first object image has been detected and the moving amount from the time $t_0$ to $t_1$ (YES), the process moves to step S117. In step S117, a moving amount of the second object image is detected for a ranging area bk of the area sensor 88b corresponding to a ranging area ak where the moving amount of the first object has been detected. This is carried out by referring to the "moving amount detection" routine of FIG. 26. At this time, a ranging area at the time $t_1$ when the moving amount of the first object image is detected is set as ak.

If shifting of the ranging area occurs, as an image moving amount, a shifting amount (e.g., pixel number conversion value of a distance between centers) between the ranging areas is added to $\Delta x_L$, $\Delta x_R$.

After the detection of the moving amounts of both of the first and second object images, the process moves to step S118, where a moving speed v of the object image in an optical axis direction is calculated by the following equation:

$$v = \frac{\Delta X_R - \Delta X_L}{t_1 - t_0} \quad (25)$$

Then, in step S119, for predetermined ranging areas to be detected, determination is made as to whether moving speed calculation has been finished or not for all. If the calculation has not been finished (NO), the process moves to step S120. In step S120, since the detection of the moving speed has been finished for the ranging area an, a next ranging area an+1 is set, and then the process moves to step S113.

If the determination in step S119 shows that all the moving speed calculations have been finished (YES), the process moves to step S121. In step S121, the calculated moving speed v is compared with a predetermined speed $v_{th}$ to determine whether the object has been moved in the optical axis direction or not for all the ranging areas.

Further, in step S122, calculation is carried out as to a blurring amount in a ranging area where the object is stationary other than the ranging areas where the object is moved to determine whether there is blurring or not. Then, in step S123, determination is made as to whether the object is stationary or not.

If this determination shows that the object is stationary (YES), the process moves to step S124 to clear an object on-movement flag. Then, the process moves to step S13, where the process is started again from the detection of the image moving amount.

On the other hand, if it is determined in step S123 that the object is not stationary but moved in the optical axis direction (NO), the process moves to step S125 to set an object on-movement flag. Then, after the setting of the object on-movement flag, in step S126, an image movement detection end flag is set. Further, in step S127, a ranging area to be focused during moving object detection is selected.

In the third embodiment, since moving object determination has been made by placing importance on the center in moving object determination step, the moving object is determined in step S127, a certain standard is set among the ranging areas, for example, a ranging area for selecting a fast moving object is selected, and the process returns to the main routine.

Next, description will be made of a main routine of a digital camera to which the auto focusing system of the present invention is applied by referring to a constitutional view of FIG. 20 and a flowchart of FIG. 28. This main routine operation is a routine which indicates a program control process started by the control section 100, and executed by an operation start of the control section 100.

First, in step S131, various correction data prestored to be used for ranging, and photometry are read from the EEPROM 110, and spread on the RAM 106.

Then, in step 132, determination is made as to whether the first release switch (1RSW) 134 has been turned ON or not. If not ON (NO), the process moves to step S133, where determination is made as to whether the switches other than the first release switch 134 and the second release switch (2RSW) have been operated or not. If the result shows that the switches have been operated (YES), the process moves to step S134 to execute a process in accordance with the switches. Then, the process moves to step S132.

On the other hand, if it is determined in step S132 that the first release switch 134 has been ON (YES), the process moves to step S135, where a state of a not-shown AF operation mode switch is determined, and determination is made as to whether an AF operation mode is "single AF" or not.

If this determination shows that the mode is a single AF mode (YES), since once focused focus locking is executed to prevent lens driving, the process moves to step S136, where determination is made as to end of focusing. However, if the mode is not a single AF mode (NO), the mode is considered as a continuous AF mode, and the process moves to later-described step S137 in order to repeat AF driving accompanying changes in the object even after focusing.

If the end of focusing (YES) is determined in step S136, the process moves to step S132 without executing AF driving. However, if not focused (NO), or in the case of the continuous AF mode, the process moves to step S137 to determine whether photometry has been finished or not.

Here, if the photometry has been finished, the process moves to step S138 to decide an exposure amount, and thus the photometrical section 118 is operated to execute a photometric operation for measuring luminance of the object.

Then, in step S139, the aforementioned subroutine "AF" is executed. As a result of this AF operation, in step S140, by referring to the detection disable flag, determination is made as to whether image deviation detection is impossible or not. If this determination shows that the image deviation detection is possible (NO), the process moves to step S141, where determination is made as to whether the moving amount of the object has been detected or not.

On the other hand, in step S140, if the image deviation detection is impossible (YES), the process moves to step S142, where a scanning operation is carried out to search a lens position which enables AF detection while driving the focus lens 66a. Then, the process moves to step S132. When this scanning is carried out, all the flags are cleared to execute AF all overt again from the start.

If it is determined in step S141 that the moving amount of the object image has been detected (YES), prediction of an image deviation amount is executed. First, in step S143, determination is made as to whether the second release switch 136 has been turned ON or not. If the secondary release switch has been turned ON (YES), the process moves to step S144 to predict an image deviation amount at the starting time of exposure.

On the other hand, if it is determined in step S143 that the second release switch 136 has been OFF (NO), the process moves to step S145 to predict an image deviation amount at the end time of lens driving. After the prediction of step S144 or S145, the process moves to later-described step S147.

If it is determined in step S141 that the moving amount of the object image has not been detected yet (NO), the process moves to step S146, where determination is made as to on-movement of the object. At this point of time, the image movement detection end flag is cleared as described later after lens driving (step S148). Even if the image movement is not detected after the lens driving on the continuous AF mode, since the object on-movement flag is set, the process moves to step S132, where the object image movement is detected again.

On the other hand, if on-movement is not determined in step S146 (NO), the process moves to step S147, where the detected image deviation amount or the predicted image deviation amount is converted into a defocusing amount, and determination is made as to whether the image is in a focus permission range or not. If this determination shows an unfocused state, the process moves to step S148, where a necessary lens driving amount is obtained to drive the focus lens. In the lens driving routine, the image deviation detection end flag, the image deviation detection disable flag, and the image movement detection end flag are cleared after the lens driving.

This clearing process is carried out because the AF is executed again from the start since the object image may be greatly changed after the focus lens is driven. As described above, only the object image on-movement flag is not cleared. A reason for this is to prevent focus determination at first AF after the lens driving on the continuous AF mode, and to continuously detect the movement of the object.

If a focused state is determined in step S147 (YES), the process moves to step S149, where determination is made as to an ON/OFF state of the second release switch 136. If the second release switch 136 is not ON (YES), the process moves to step S150 to determine whether current blurring is large or not.

If it is determined in step S150 that the blurring is not large, the process moves to step S151. In step S151, determination is made as to passage of predetermined time after turning-ON of the second release switch 136. If the passage of the predetermined time is determined, the process moves to step S152. If not determined, the process moves to step S139 to execute moving object detection and blurring detection.

Step S151 is for limiting a time lag after the turning-ON of the second release switch 136. The blurring detection is canceled unless the blurring becomes small within predetermined time. Then, the process moves to step S152, where based on the photometric value stored in the RAM 106, the diaphragm and the shutter are controlled to execute an exposure operation (imaging). Then, in step S153, image data obtained by the imaging is processed to be recorded on the recording medium. Then, a series of photographing operations are finished.

As described above, according to the third embodiment, the positions of the object image in both of the image dividing direction and the direction vertical to the image dividing direction are detected on the area sensor. Thus, even in the case of the moving object which moves up and down and left and right, the position of the object image can be detected, and prediction control is possible to enable accurate focusing. Moreover, in the ranging area where the object is stationary, the presence of blurring is determined based on the image signal, and the exposure sequence is started by a timing of small blurring. Thus, it is possible to simultaneously execute moving prediction control and blurring prevention control.

Next, description will be made of the moving object determination process of step S121 of the flowchart of FIG. 25 by referring to a flowchart of FIG. 29.

In the moving object determination routine, first, an initial ranging area is set in step S161. For example, a ranging area P1 is set. Then, in step S162, a value of a predetermined speed $V_{th}$ is set for each ranging area. As described later with reference to FIG. 30, $V_{th}$ is set to be larger in peripheral ranging areas than a center ranging area.

Figure 27:
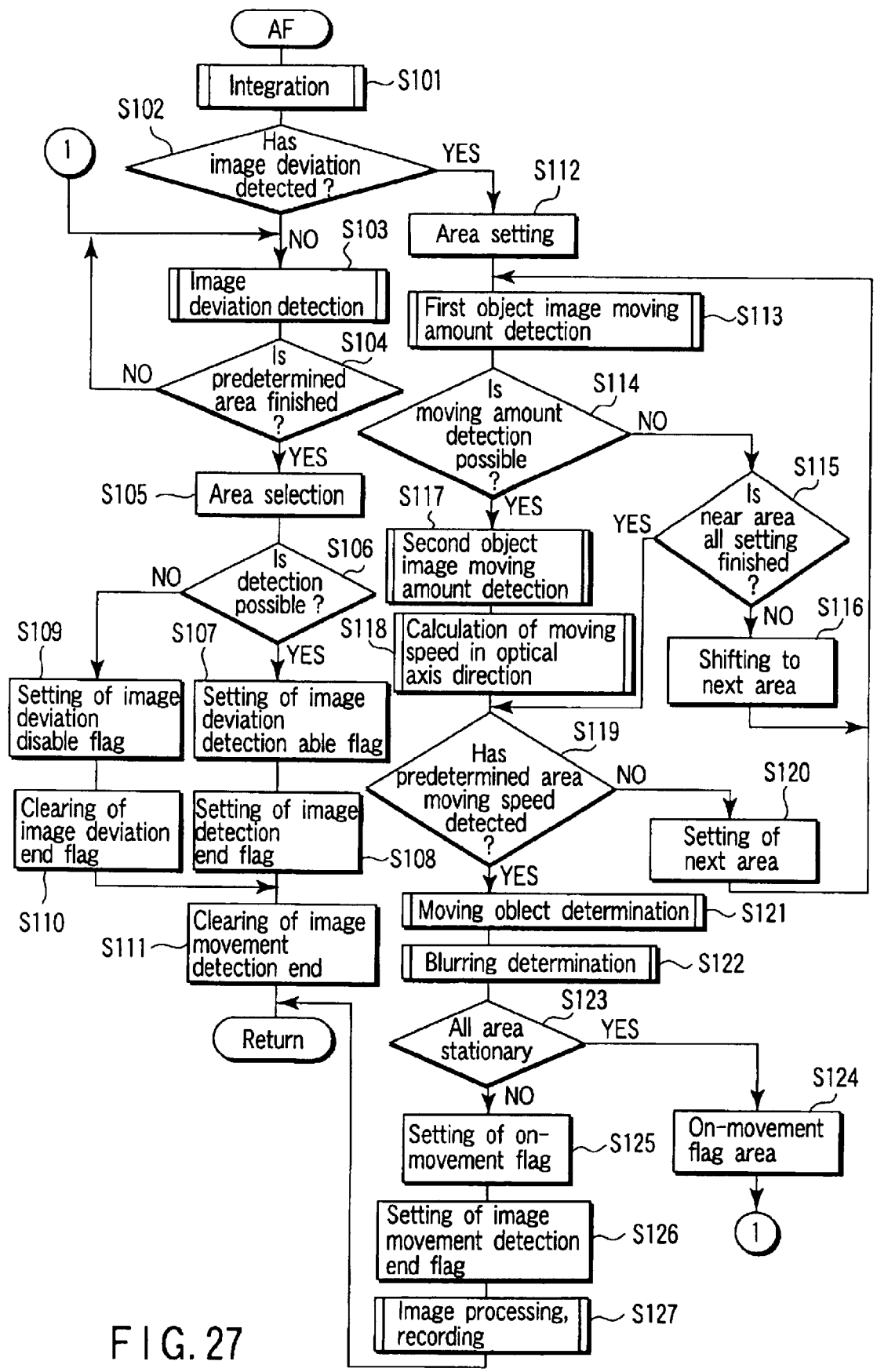
FIG. 27 is a flowchart explaining a specific operation program of the third embodiment.

Then, in step S163, determination is made as to the ranging area where the image movement can be detected in step S114 of the flowchart of FIG. 27. If the ranting area where the detection is possible is determined (YES), the process moves to step S164. Then, $V_{th}$ of each ranging area set in step S162 is compared with the image moving speed calculated in step S118 of the flowchart of FIG. 27 to determine whether the object is a moving object or not.

If it is determined in step S164 that the moving speed is larger than $V_{th}$ (YES), the object is determined to be a moving object, and the process moves to step S165, where information indicating that the object of the set ranging area is a moving object is stored in the RAM 106. However, if it is determined that the moving speed is smaller than $V_{th}$ (NO), the object is determined to be a stationary object. Thus, the process moves to step S166, where information indicating that the object of the set ranging area is a stationary object is stored in the RAM 106.

Then, in step S167, determination is made as to whether moving object determination has been finished or not for all the ranging areas. If the end is determined (YES), the process returns. On the other hand, if the end is not determined (NO), the process moves to step S168 to set a next ranging area. Then, the process moves to step S162.

Next, by referring to FIG. 30, description will be made of the setting of the predetermined value $V_{th}$ for each ranging area in step S162 of the flowchart of FIG. 29.

Figure 30:
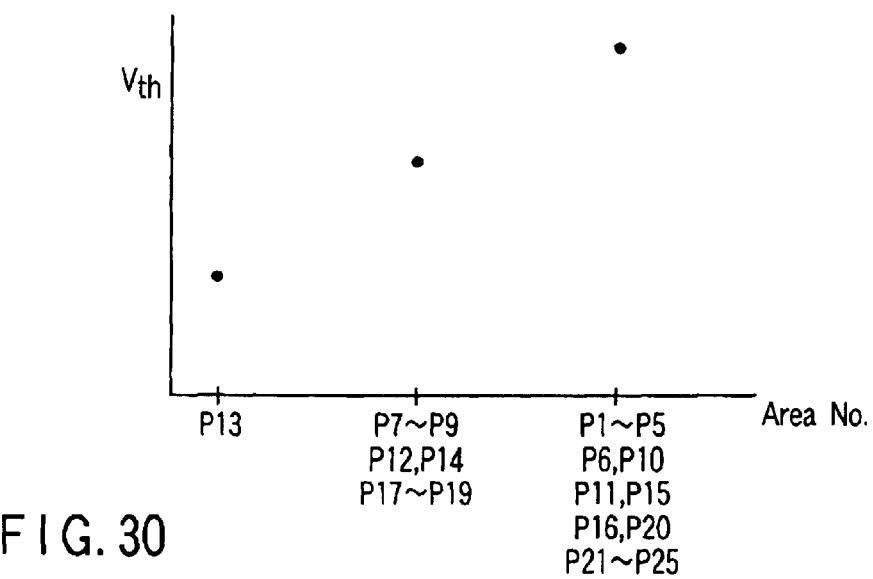
FIG. 30 is a view explaining setting of a predetermined speed $V_{th}$ value for each ranging area.

An abscissa of FIG. 30 is equivalent to ranging area numbers described above with reference to FIGS. 21A and 21B, and an ordinate represents $V_{th}$.

A ranging area P13 is a ranging area (ranging area m) on the center of the photographing screen, and ranging areas P7 to P9, P12, P14, P17 to P19 constitute a first ranging area group adjacent (around one area) to the ranging area P13. Similarly, ranging areas P1 to P5, P6, P10, P16, P20, P21 to P25 constitute a second ranging area group from the center raging area to the periphery of two areas.

FIG. 30 shows an example where $V_{th}$ of the first ranging area is twice as large as that of the center ranging area P13, and $V_{th}$ of the second ranging area group is three times as large. By this setting, moving object determination for the moving object present in the second ranging area group is three times as large as that in the center ranging area P13.

As described above, according to the third embodiment, the object is determined to be a moving object more easily as it is closer to the photographing screen center to facilitate focusing of the center moving object.

Next, by referring to a flowchart of FIG. 31, description will be made of the blurring determination subroutine of step S122 in the flowchart of FIG. 27.

First, in step S171, an area where an image moving speed is lowest shown in FIG. 30 (i.e., area where the object is most stationary) is set as an initial area. Then, in step S172, determination is made as to whether contrast (difference between lowest and highest values of pixel output in the area) is sufficiently large or not. This determination is carried out because small contrast leads to a reduction in reliability of image movement calculation. If this determination shows that it is an area of small contrast (NO), the process moves to step S173, where no executing blurring calculation is executed in this area, and next area is set. For this next area, for example, an area of a image moving speed small next to that of a current set area, or an area adjacent to the current set area may be set.

On the other hand, if it is determined in step S172 that contrast is sufficiently large (YES), the process moves to step S174, where a larger value of an absolute value of the moving amount $\Delta x_L$ of the first object image and an absolute value of the moving amount $\Delta x_R$ of the second object image is set as $\Delta x$.

Then, in step S175, determination is made as to whether this $\Delta x$ is larger or not than a preset predetermined value. If it is determined that it is larger than the predetermined value (YES), large blurring is determined, and the process moves to step S176 to set a blurring flag. This flag is used for determination of step S150 of the flowchart of FIG. 28. On the other hand, if it is smaller than the predetermined value (NO), small blurring is determined in the current set area, and the process moves to step S177 to clear the blurring flag.

Further, after the clearing of the blurring flag in step S177, the process moves to step S178, where determination is made as to whether blurring determination has been finished or not for all the areas. If finished for all the areas (YES), understanding that there is no blurring at all, the process returns while the blurring flag is in the cleared state. On the other hand, if not finished for all the areas (NO), the process moves to step S179 to set a next area. Then, the process moves to step S172 to repeat the same process.

Figure 29:
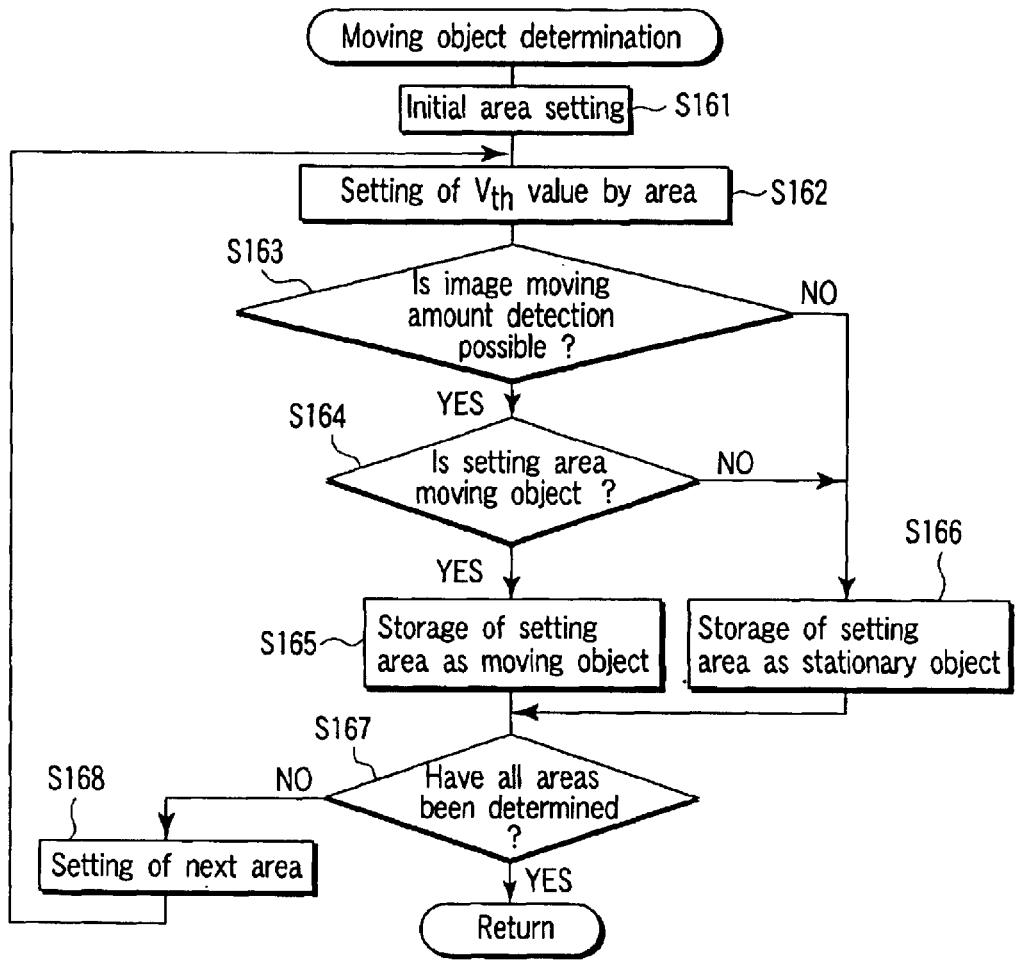
FIG. 29 is a flowchart explaining moving object determination of FIG. 27.

By carrying out such blurring determination, it is possible to determine blurring in all the areas where the object is determined to be stationary in the flowchart of FIG. 29.

FIGS. 32A and 32B are views explaining a concept of the blurring determination.

FIG. 32A shows sensor data outputs of the L and R sides of adjacent pixels in an optional area where a stationary object imaged at the time $t_1$ is present. FIG. 32B similarly shows sensor data outputs imaged at the time $t_2$ after passage of predetermined time from the time $t_1$.

For example, if it is assumed that codes and absolute values of the moving amount $\Delta x_L$ of the first object image and the moving amount $\Delta x_R$ of the second object image are identical, a moving speed of the object in the optical axis direction becomes 0 by the equation (25). That is, FIGS. 32A and 32B show the example where the object is completely stationary, and an imaging range is moved in the pixel arraying direction by the blurring of the photographer.

Thus, in the sensor data of the area where the blurring is observed, $\Delta x_L - \Delta x_R$ of the equation (25) becomes a small value, while an absolute value of $\Delta x_L$ or an absolute value of $\Delta x_R$ becomes a somewhat large value. In FIGS. 32A and 32B, blurring detection is carried out by paying attention to this nature.

Various changes can be made of the foregoing embodiment without departing from the teachings of the present invention. For example, the vibration isolation control has been described by way of the system which waits for exposure until a timing of a small blurring. However, the control is not limited to this, and blurring only needs to be prevented, and other detection systems may be used for the moving object prediction control as long as they can detect the moving object.

Thus, according to the present invention, it is possible to provide the auto focusing system where a focusing point can be obtained at a high speed, and the main body is not enlarged.

Furthermore, according to the present invention, it is possible to provide the auto focusing system where the moving body prediction AF is carried out in the focus detection area in which the moving object is detected, and the blurring detection is carried out in the other areas, the moving object and blurring detections can coexist by using the AF sensor outputs, and the effect of the moving object prediction AF and the effect of the vibration isolation control can be simultaneously achieved.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. An auto focusing system which comprises:
   light receiving means for imaging an object as a digital image;
   optical means for guiding a light from the object to the light receiving means;
   a split image prism movable between a position immediately before a light receiving surface of the light receiving means in an optical path of the optical means and a position outside the optical path of the optical means; and
   control means for detecting a deviation amount of a video signal based on light rays passed through the split image prism, and focusing the optical means based on the deviation amount.

2. An auto focusing system which comprises:
   light receiving means for imaging an object as a digital image;
   optical means for guiding a light from the object to the light receiving means;
   a split image prism installed in a position that is immediately before a light receiving surface of the light receiving means and is outside an optical path of the optical means;
   deflection means which is removably inserted into the optical path of the optical means and guides a part of a luminous flux from the object to the split image prism; and
   control means for detecting a deviation amount of a video signal based on light rays passed through the split image prism, and focusing the optical means based on the deviation amount.

3. The auto focusing system according to claims 2, wherein the deviation amount of the video signal is detected for each of a plurality of sets, each comprising upper and lower light receiving element columns of the light receiving means parallel to a splitting direction of the split image prism, and focusing of the optical means is carried out based on the plurality of deviation amounts.

4. The auto focusing system according to claim 3,
   wherein the auto focusing of the optical means is carried out and all the plurality of deviation amounts of the video signal fall in a predetermined range.

5. The auto focusing according to claim 4, further comprising memory means for storing and saving as an adjustment value an average value that falls within the predetermined range and is an average among the plurality of deviation amounts of the video signal based on light rays passed through the split image prism after the focusing of the optical means is carried out by a contrast system which uses the video signal of the light receiving means based on light rays not passed through the split image prism.

6. The auto focusing system according to claim 1, wherein among light receiving element columns of the light receiving means parallel to the splitting direction of the split image prism, two columns at a predetermined space are made one set, deviation amounts of the video signal are detected for a plurality of sets, and the focusing of the optical means is carried out based on the plurality of deviation amounts.

7. The auto focusing system according to claim 2,
   wherein among light receiving element columns of the light receiving means parallel to the splitting direction of the split image prism, two columns at a predetermined space are made one set, deviation amounts of the video signal are detected for a plurality of sets, and the focusing of the optical means is carried out based on the plurality of deviation amounts.

8. An auto focusing system comprising:
   a light receiving section constituted of an imager such as a photoelectric transducer to image an object as a digital image;
   an optical system which guides a light from the object to the light receiving section;
   a split image prism movable between a position immediately before a light receiving surface of the light receiving section in an optical path of the optical system and a position outside the optical path of the optical system; and
   a control section which detects a deviation amount of a video signal based on light rays passed through the split image prism, and focuses the optical system based on the deviation amount.

9. An auto focusing system comprising:
   a light receiving section constituted of an imager such as a photoelectric transducer to image an object as a digital image;
   an optical system which guides a light from the object to the light receiving section;
   a split image prism installed in a position that is immediately before a light receiving surface of the light receiving section and is outside an optical path of the optical system;
   a deflection member which is removable inserted into the optical path of the optical system and guides a part of a luminous flux from the object to the split image prism; and
   a control section which detects a deviation amount of a video signal based on light rays passed through the split image prism, and focuses the optical system based on the deviation amount.

10. The auto focusing system according to claim 9, wherein the deviation amount of the video signal is detected for each of a plurality of sets, each comprising upper and lower light receiving element columns of the light receiving section parallel to a splitting direction of the split image prism, and focusing of the optical system is carried out based on the plurality of deviation amounts.

11. The auto focusing system according to claim 10,
    wherein the focusing of the optical system is carried out so as to set all the plurality of deviation amounts of the video signal in a predetermined range.

12. The auto focusing system according to claim 11, further comprising memory section for storing and saving as an adjustment value an average value that falls within the predetermined range and is an average among the plurality of deviation amounts of the video signal based on light rays passed through the split image prism after the focusing of the optical system is carried out by a contrast system which uses the video signal of the light receiving section based on light rays not passed through the split image prism.

13. The auto focusing system according to claim 8, wherein among light receiving element columns of the light receiving section parallel to the splitting direction of the split image prism, two columns at a predetermined space are made one set, deviation amounts of the video signal are detected for a plurality of sets, and the focusing of the optical system is carried out based on the plurality of deviation amounts.

14. The auto focusing system according to claim 9, wherein among light receiving element columns of the light receiving section parallel to the splitting direction of the split image prism, two columns at a predetermined space are made one set, deviation amounts of the video signal are detected for a plurality of sets, and the focusing of the optical system is carried out based on the plurality of deviation amounts.

* * * * *